United States Patent [19]
Knight

[11] Patent Number: 5,900,805
[45] Date of Patent: May 4, 1999

[54] CAR ALARM

[76] Inventor: Shane Edwin Knight, 51 Woodanga Street, Murarrie, Queensland, 4172, Australia

[21] Appl. No.: 08/869,910

[22] Filed: Jun. 5, 1997

[30] Foreign Application Priority Data

Jun. 6, 1996 [AU] Australia ................... PO0328
Feb. 6, 1997 [AU] Australia ................... PO4966

[51] Int. Cl.⁶ .................................................. B60R 25/10
[52] U.S. Cl. ................ 340/426; 340/425.5; 340/429; 340/430; 307/10.2
[58] Field of Search .......... 340/309.15, 309.13, 340/309.4, 576, 439, 430, 429, 426, 425.5, 457, 514; 307/10.2

[56] References Cited

U.S. PATENT DOCUMENTS 3,947,815  3/1976  Muncheryan ................... 340/575
5,684,462  11/1997  Gold ................................ 340/576

*Primary Examiner*—Jeffery A. Hoffsass
*Assistant Examiner*—Daryl C. Pope
*Attorney, Agent, or Firm*—Young & Thompson

[57] ABSTRACT

A car alarm is provided for a vehicle. The alarm has a warning system having a sleep alert device with a touch sensor and a siren. When the system is switched ON the touch sensor must be touched within a first set time period. Otherwise the siren will be energized for a second set time period or until the touch sensor is touched. In a preferred embodiment the warning system also has a anti-theft device which is put in operation by turning the ignition switch to the OFF position. A programmed controller means is employed for controlling functions of the sleep alert device and the anti-theft device.

29 Claims, 22 Drawing Sheets

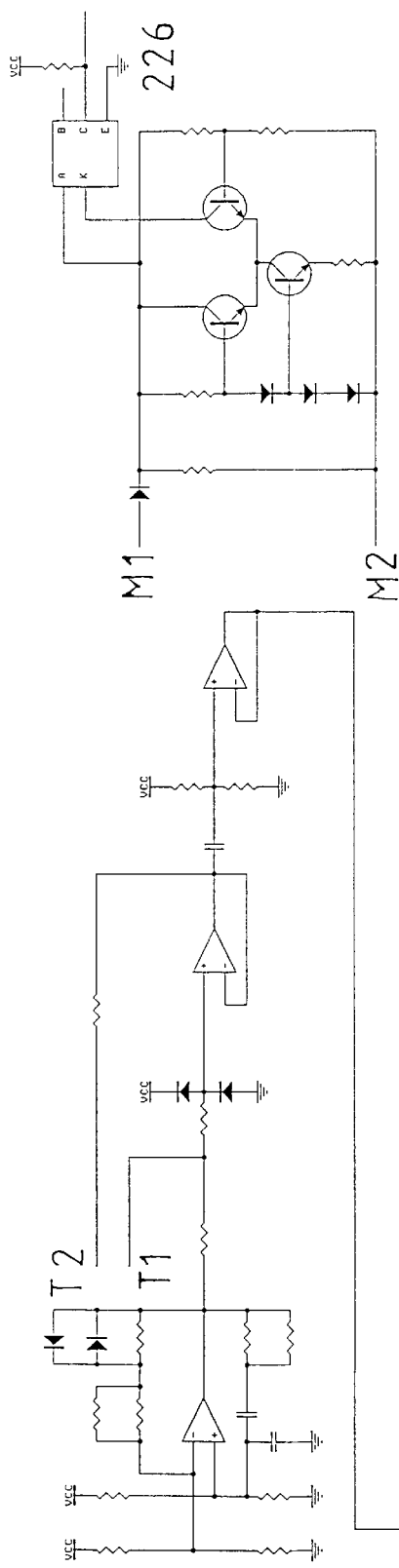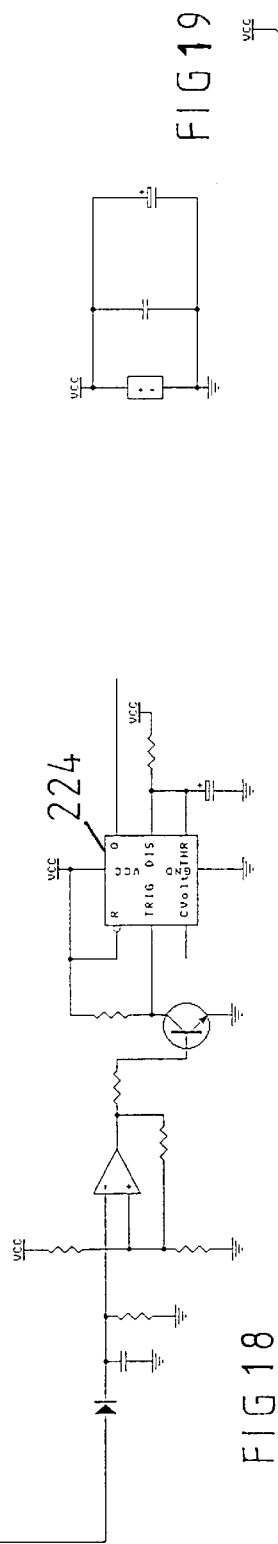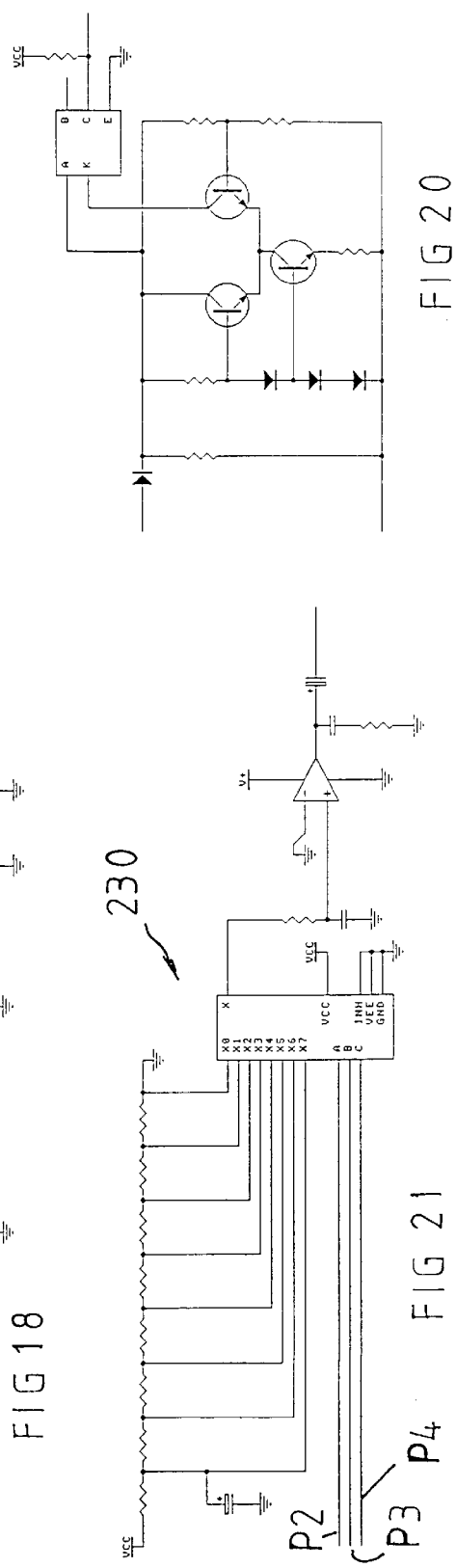

CAR ALARM

FIELD OF THE INVENTION

This invention relates to a warning system for alerting a driver who has fallen asleep, or is in a state of approaching so or generally not sufficiently alert for driving a vehicle. In particular, but not limited thereto, the present invention relates to a warning system which comprises in combination a warning unit and an antitheft unit.

DISCUSSION OF THE PRIOR ART

Researches have shown that many vehicle residents are caused by drivers who have fallen asleep or are through tiredness, effect drugs or otherwise not sufficiently alert to drive safely. Attempts have been made to maintain alertness by listening to loud music, eating, singing and/or talking. None of the above attempts have been successful in maintaining satisfactory alertness for a long period. Other attempts employ devices which produce warning signals when their mechanical switches have not been actuated for given time periods. But these switches are fixedly positioned on the vehicle and their positions can not be adjusted to suit different people. The itches, being mechanical and requiring springs to maintain contact separation are prone to failures such as welded contacts or closed contacts due to the spring failure. They also need frequent maintenance. Accordingly these prior it devices have not been totally successful in convincing drivers to use them. On the other hand the number of vehicle thefts has increased progressively over the past decades. Vehicle owners prefer to have anti-theft alarms installed and alert warning devices are often not considered due to the costs in acquiring and installing 2 separate systems. This is evident from the vast number of anti-theft alarms on the market in comparison to the number of driver alert devices.

People using the known warning systems, in particular known anti-theft alarms cannot be entirely certain that their systems are going to be functioning properly when the systems are switched on. Therefore there is a need to give a clear indication that the systems would function as designed.

Accordingly it is an object of the present invention to alleviate or at least reduce to some degree one or more of the above prior art disadvantages.

SUMMARY OF THE INVENTION

In one aspect therefore the present invention provides a warning system for a vehicle and the system comprises touch sensor means having a base which is selectively securable an the vehicle, warming means and a circuit means connecting the touch sensor to the warning means. The circuit means is adapted to detect touching of the sensor means and to activate the warning means after expiration of a predetermined time period following touching.

The touch sensor means may be a capacitive type or a microswitch. The sensor means may be secured to the vehicle at a position to the vehicle at a position where it can be touched by a driver. The driver may touch the sensor by a finger, a hand, a foot or any other part of the drivers body. Preferably the sensor means is adjustable. More preferably the sensor means has an adjustable metallic pant.

Preferably the base includes a releasable securing means for securing to the vehicle. More preferably the securing mean is a suction cap which can be secured on a smooth surface. Conveniently, the smooth surface is a part of the windscreen, or dash board, or steering column cover, or window and the like of the vehicle.

Advantageously the securing means consists of a first securing part halving a plurality of spaced engagement means, and a second securing part having means matchable engageable with one of the engagement means. Each engagement means may be a lipped slot and the matching means can be a T-shaped projection which may be inserted in the slot and retained therein.

The adjustable metallic part may be on the base and is adapted for touching by the driver. Typically the metallic part is adjustably positionable close to the driver so that the sensor can be touched with a small movement of a body part of the driver. Preferably said body part is a hand or a finger. Advantageously the sensor means is so disposed that it can be touched without lifting a hand from the steering wheel of the vehicle. The metallic part of the sensor means can be in the form of a knob, a button, a wheel, a ring or a curved section, etc.

The means for adjusting the position of the metallic part can be a telescopic sectioned rod. Alternatively it can be a first elongate member releasably fixable to a second gate member who is secured to the base. The metallic part may be an integral part of the adjusting means or secure thereto, and is electrically connected to the circuit means.

The circuit means preferably comprises a first adjustable timing means adapted to delay energisation of the warning means for a predetermined time interval.

The first timing means may be an astable timer and the predetermined time interval can range from 1 to 15 seconds but 3 seconds are preferred.

The warning means is advantageously a siren capable of producing output up to 200 decibel. However 120 decibel is considered suitable in most cases.

Preferably the, circuit means has a pre-warning indication means for indicating to the driver that the warning means will produce a warning signal after the predetermined time interval. The pre-warning indication mean is preferably an audio means and/or a visual means. Typically the pre-warning audio means is a buzzer and the pre-warning visual means is a red bezel. Advantageously the pre-warning indication mean is energised by a pulsed current from a second adjustable timing means. Preferably the pulsed current has an equal mark space ratio which determines the ON and OFF periods of the pre-warning indication means. More preferably the On and OFF periods are 0.5 seconds.

For a discrete operation, a headphone device can be selectively connected so that signals to the warning means and/or the pre-warning indication means are diverted to the headphone device.

Where the predetermined time interval has elapsed and the touch sensor has not been activated, the warning mean is energised to produce the warning signal. The warning means can be de-energised by touching the sensor means.

Preferably a first switching means is employed for controlling the energisation of the warning means. More preferably the first switching means is controlled by the first timing means whereby the warning means is energised when the predetermined time interval elapses. The first switching means may be a relay, a transistor or a semiconductor switch.

The warning system is conveniently provided with a system ON-OFF switch. When the system switch is ON the first timing means is set to produce an output current for the predetermined time period described above. The second timing means is also set to produce the pulsed output for energising, the per-warning indication means.

A capacitor can be connected to the first switching means to maintain energisation of the first switching means for a fraction of a second and thereby preventing a moment energisation of the warning means when the first timing means is activated.

Where the touch sensor is touched, the warning means is prevented from energisation for a set time period. Preferably the pre-warning indication mean is also prevented from energisation for said time period. Typically activation current for the first and/or second timing means are interrupted when the sensor is touched and thereby effectively stops the energisation of the pre-warning indication means and the warning means.

The circuit means preferably includes a third timing means having an adjustable timing interval. The third timing means is adapted to be activated by the touching of the touch sensor whereby the third timing means produces an output for a set time interval. Preferably the set interval can be adjusted between 1 to 90 sec. The applicant has found that a 30 second interval is generally suitable for alerting a driver with negligible or no effect on driving behaviour or safety. A variable potentiometer may be employed for adjusting the desired time interval. After the elapse of the set time interval of the third timing means the first timing means is reactivated as above described. The second timing means is also reactivated as above described. The device then returns to the state prior to touching the touch sensor.

The touch sensor means is adapted to conduct current to the circuit means when it is touched by the driver. Advantageously an inductor is connected between the sensor means and the circuit means for preventing noise signals from falsely activating the device. Typically, shielding means is also provided for shielding noise signals from falsely activating the device. On a preferred form, the touch sensor is connected to the circuit means by a coaxial cable and the metal mesh on the cable forming the shielding means.

An LED may be employed to indicate that the device is ON and is within the set time interval after the sensor is touched.

A second controlled switching means is advantageously provided for controllably energising the first and second timing means.

Preferably the second switching means provides a current path from the system ON-OFF switch to the first and second timing means. The second switching mean as adapted to break the connection for the set time interval of the third timing means upon touching the touch sensor.

The above described warning system requires the driver to touch the sensor periodically in order to prevent the energisation of the warning means. This action maintains driver alertness while driving as failure to touch the sensor within the time interval set by the first timing means will result in a loud warning from the warning means which is unbearable. The device therefore discourages a driver who is not sufficiently alert from driving further.

In a second aspect of the present invention the warning system includes an anti-theft device. The anti-theft device is adapted to be armed by touching the sensor means to initiate the third timing means to delay the energisation of the warning means for a time interval, followed by turning the ignition switch off and opening and then closing a door or doors of the vehicle, within the time interval.

A third switching means may be provided for preventing energisation of the warning means by opening or closing a vehicle door within the time interval.

Preferably the set time interval can be adjusted prior to or during activation of the anti-theft device. The adjustment is conveniently made through the adjustable potentiometer.

An armed indication means may be proved for indicating that the anti-theft device is armed. The armed indication means is preferably a flashing LED.

Where a door is opened after the set time interval the third switching means provides a path for energising the warning means.

A fourth switching means may be provided for interrupting the output from the third timing means while the anti-theft means is armed. This prevents deenergisation of the warning means by touching the sensor means.

The device may be adapted so that switching of the system switch has no effect on the anti-theft device when armed.

Preferably the circuit includes a fifth switching means which provides a current path to the warning means when the ignition switch is "hot wired".

The anti-theft device is conveniently adapted to energise the warning means where entry to the vehicle is not through one of the doors and the ignition switch is "hot wired". Penetrably the touch sensor output is interrupt where the vehicle is "hot wired" without opening a door of the vehicle. The fourth switching means can be employed for interrupting the sensor output. Current from the door switch can also be interrupted after the ignition switch is "hot wired" in order to prevent interruption of energising current to the warning means by opening and/or closing a door.

Preferably the third switching means is adapted to interrupt current from the door switch in the event of hot wiring.

To re-enter the vehicle without energisation the warning means, the door switch must first be closed by opening a door of the vehicle and then switching the ignition switch ON within a predetermined time. The predetermined time may be adjustably settable on a fourth timing means. Preferably the predetermined times is between 10–15 seconds. Typically opening a door during re-entry will close the door switch and the fourth timing means is activated to prevent energisation of the warning means for the predetermined time interval for allowing time to turn the ignition switch ON. Failure to turn the ignition switch ON within the time interval will energise the warning means.

To complete the disarming process the warning system must be switched off within the predetermined time after the ignition switch is on.

The circuit means is adapted to prevent the warning system from functioning prior to switching ON the ignition switch. This prevents unintentional activation of the warning system. Preferably the fifth switching means can be adapted to break the current path to the warning means when the ignition switch is OFF. More preferably the current path to the door switch is also broken so that opening the door will not cause the warning means to he energised.

Each of the switching means as described above may be replaced by a relay, a transistor, a semiconductor switch or the like. Preferably the switching means and the timers are mounted on a printed circuit board. More preferably the switching means and the timers are printed component which can be fabricated in a microchip.

Advantageously, the systems of the present invention includes a self testing procedure for testing selected functions. An audio and/or visual indications are desirably provided where any of the selected functions fail to function as designed.

The circuit means conveniently includes a programmed controller means which is arranged to detect drive action on the touch sensor means and to activate the warning means when there is no action on the touch sensor within the predetermined time period.

A touch sensor switching circuit may he employed far signalling the controller means when the touch sensor means is touched.

For anti-theft operation, the controller means can be arranged to receive signals from theft sensor means which may include a door sensor means and/or a motion detection means.

A theft sensor switching circuit may he employed for signalling the controller means when the theft sensor means senses a condition corresponding one or more of the followings:

opening a vehicle door, or tailgate when the vehicle is armed;

opening the bonnet when the vehicle is armed; and breaking a window or windscreen when the vehicle is armed.

The system of the present invention typically include a motion detection means for detecting any motion within a vehicle and/or breaking of a window or windsreen of the vehicle when the anti-theft device is armed. The warning means can be energised when a detection signal is generated from the motion detection means.

Components of the programmable controller means and other circuit components may be made by surface mounting or any other known methods for making or assembling electronic components.

In a preferred arrangement the device has a first removable hand held unit which includes the touch sensor means and a second unit which includes the programmable controller means. The second unit may be removable or fixedly secured in the vehicle.

It is desired that the first unit further includes a timer adjustment means for adjusting the time for delaying energisation of the warning means. The first unit can also have adjustment means for the loudness and/or brightness of the warning means.

The applicant has devised a number of independent innovations as described above. These innovations have been described independently and in a synergistic combination. The applicant reserves his rights to divide the present application following the result of an International Search.

BRIEF DESCRIPTION OF THE DRAWINGS

In order that the present invention can be more readily understood and be put into practical erect reference will now be made to the following drawings illustrating embodiments of the present invention.

FIG. 3 illustrates the circuit of FIG. 2 and showing the relay contact positions when the ignition switch is ON;

FIG. 4 illustrates the circuit of FIG. 3 and showing the relay contact positions when the warning system is switched ON after the ignition switch is ON;

FIG. 7 illustrates the circuit of FIG. 6 and showing the relay contact positions when a door switch is ON;

FIG. 13 illustrates the circuit of FIG. 12 and showing the relay contact positions when the ignition switch is ON;

FIG. 15 illustrates the circuit according to the present invention and showing the relay contact positions when the system is turned ON;

FIG. 18 shows a touch sensor switching circuit for the system of FIGS. 16 and 17;

FIG. 19 shows a motion detection circuit for the system of FIGS. 16 and 17;

FIG. 20 shows a door sensing circuit for the system of FIGS. 16 and 17;

FIG. 21 shows a headphone circuit for the system of FIGS. 16 and 17;

DESCRIPTION OF THE PREFERRED EMBODIMENTS

Figure 1:
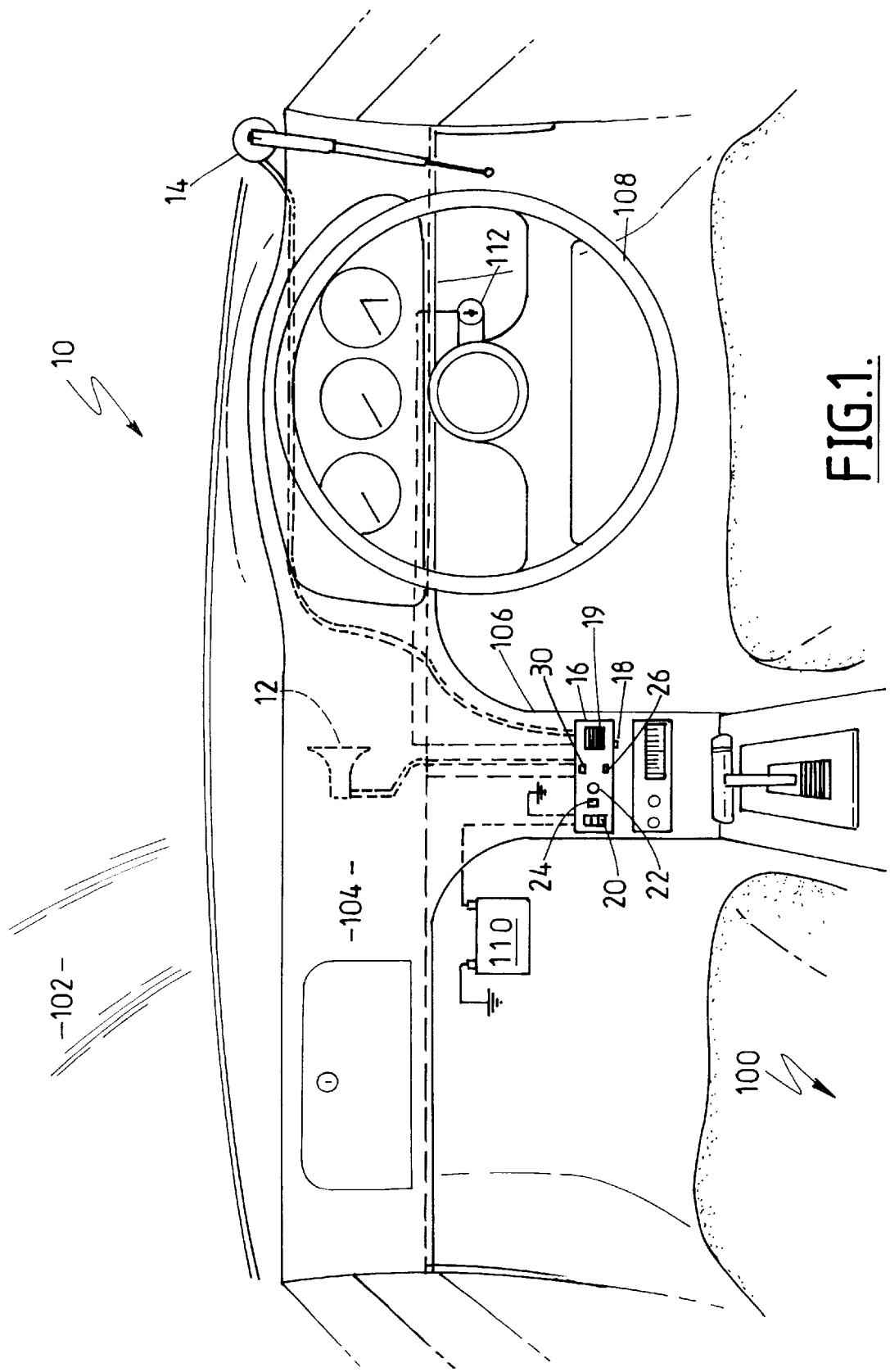
FIG. 1 illustrates a warning system according to the present invention and showing an example of the positions of component parts of the system in a vehicle.

Referring initially to FIG. 1 there is shown a warning system 10 according to the present invention. The system 10 as shown is installed in a vehicle 100 having a windscreen 102 adjacent to a dashboard 104. A central console 106 is positioned in the medial position of the vehicle 100 and beneath the dashboard 104. A steering wheel 108 is rotatably supported on a column (not shown). A key operated ignition switch 112 is located adjacent to the column. Except for a warning siren 12, and a touch sensor 14, the components of the warning system 10 are located in a casing 16 which is removably mounted in the console 106. The casing 16 has a front facial plate 18 on which are disposed a system switch 20, a timer dial 22 for adjustably setting a time interval for energising the warning siren 12, an LED indicator 26 for indicating that the time interval for energising the warning siren 12 is set, a red bezel indicator 19 and a piezzo buzzer 28 (not shown in FIG. 1) located in or on the casing 16 for indicating that the warning siren 12 will be energised in a predetermined time, and a flashing LED 30 for indicating that the anti-theft device is armed. The facial plate 18 also includes a piezzo buzzer volume adjustment means 24. The siren 12 and the touch sensor 14 are connected to components in the casing 16 by wires shown in phantom. Coaxial cable is used to connect the touch sensor 14 to the components in order to prevent false activation of the siren 12 by noise. Power to the system 10 is from the vehicle battery 110.

Figure 2:
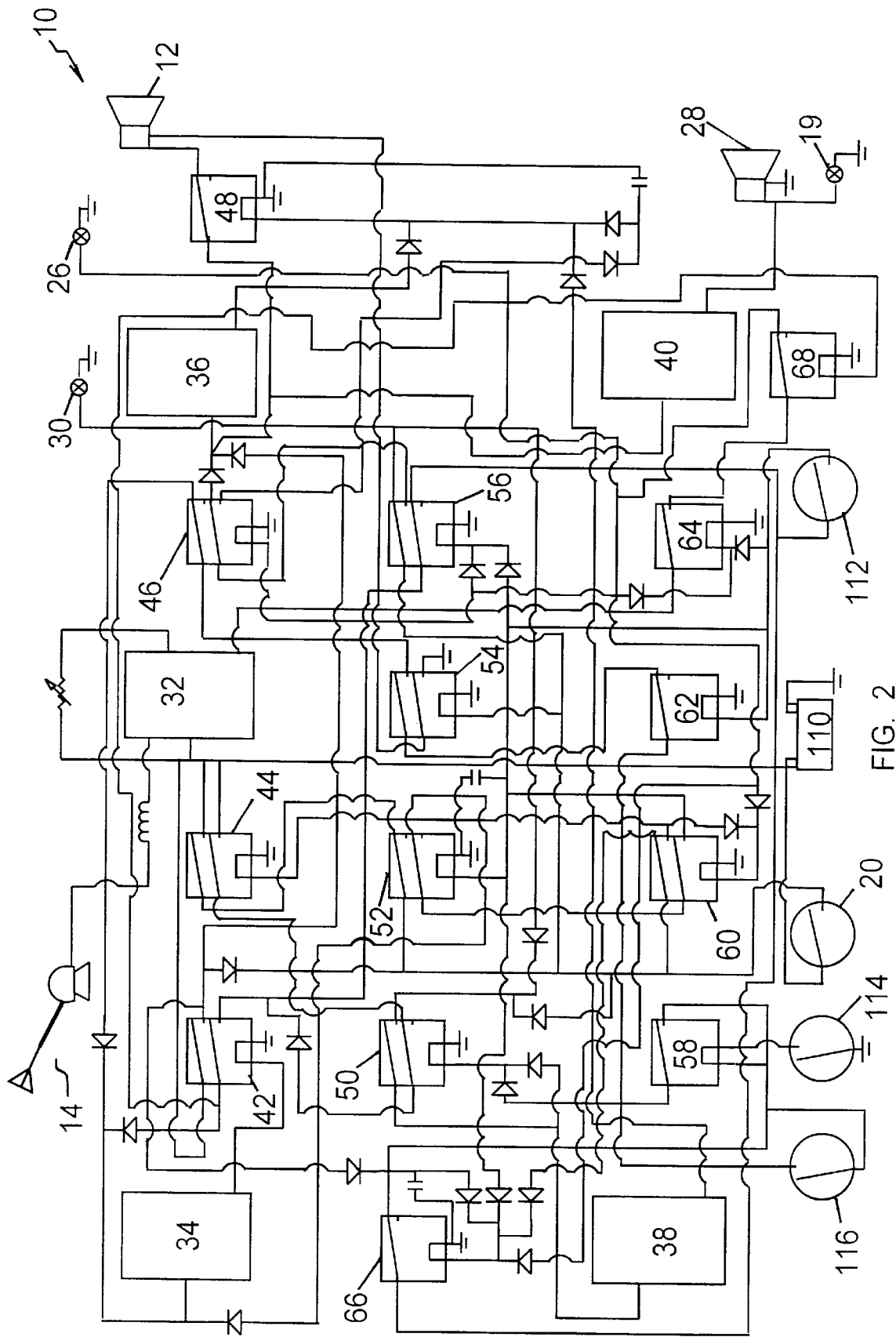
FIG. 2 illustrates a circuit of an example of the warning system according to the present invention and showing the contact positions of the relay switches when the system is switched OFF.

Referring now to FIGS. 2 to 15 which illustrate the circuit of the warning system 10. FIG. 2 shows the current paths and the contact positions of relays in the circuit when the system 10 is in the OFF position.

The circuit has a monostable timer 32 adapted to be activated when the touch sensor 14 is touched by the driver of the vehicle 100. The circuit includes four astable timers 34, 36, 38 and 40 and fourteen relays 42, 44, 46, 48, 50, 52, 54, 56, 58, 60, 62, 64, 66 and 68 connected as shown in the FIG. 2. Relays 48, 58, 62, 64, 66 and 68 are SPDT type relays, whilst the other relays are DPDT type.

Figure 3:
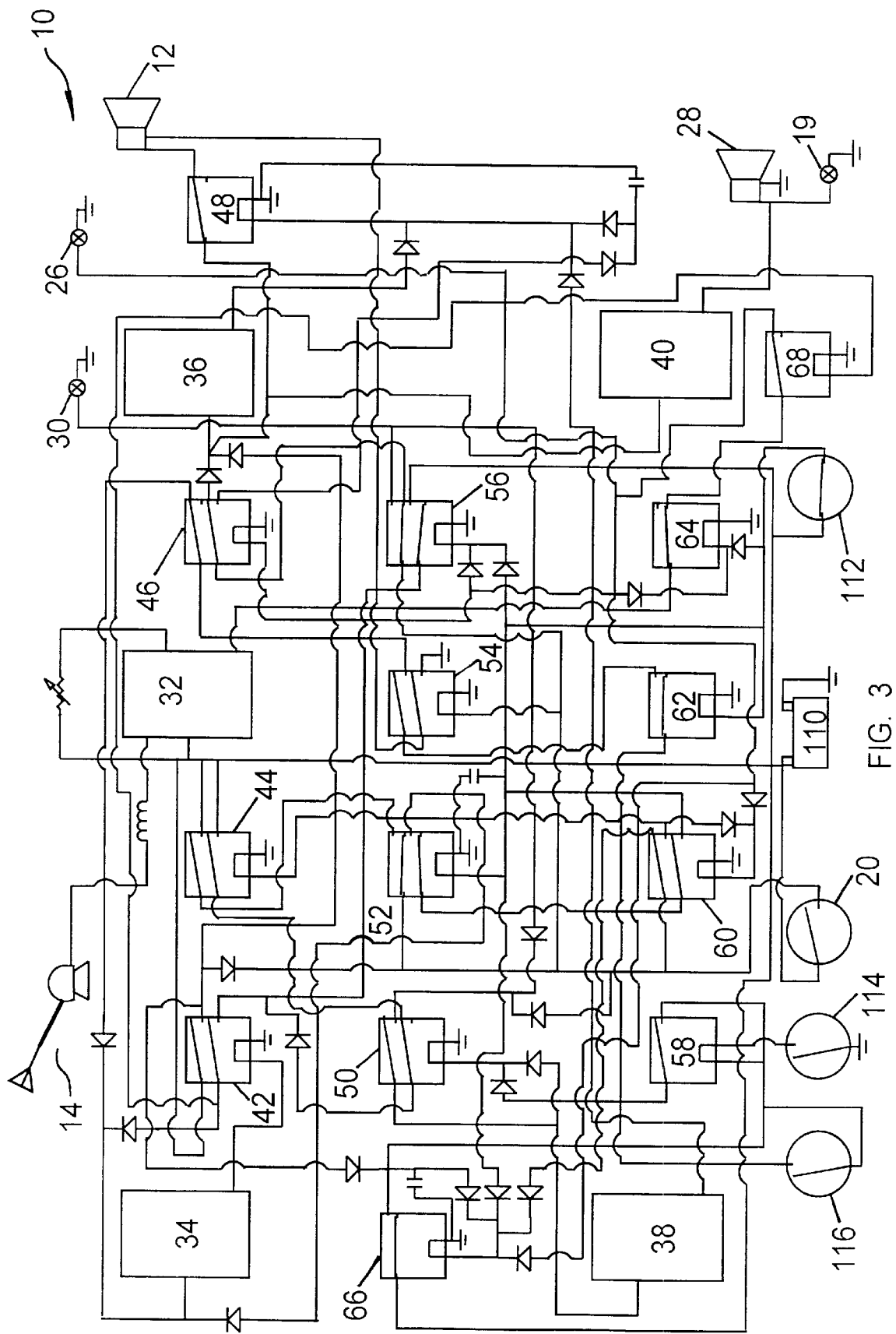

As shown the FIG. 3, when the ignition switch 112 is ON, relays 52, 56, 62, 64 and 66 are energised. Relay 52 opens its contacts to break current paths therethrough. Relay 56 closes its contacts for a current path from the system switch 20 to the astable timer 36 via relay 46. Relay 62 opens its contacts and relay 64 connects the output of monostable timer 32 to relay 68. Relay 66 breaks the current path to the vehicle door switch 114 or 116. The siren 12, buzzer 28 and bezel 19 will not be energised as the respective timers 36 and 40 have not been activated.

Figure 4:
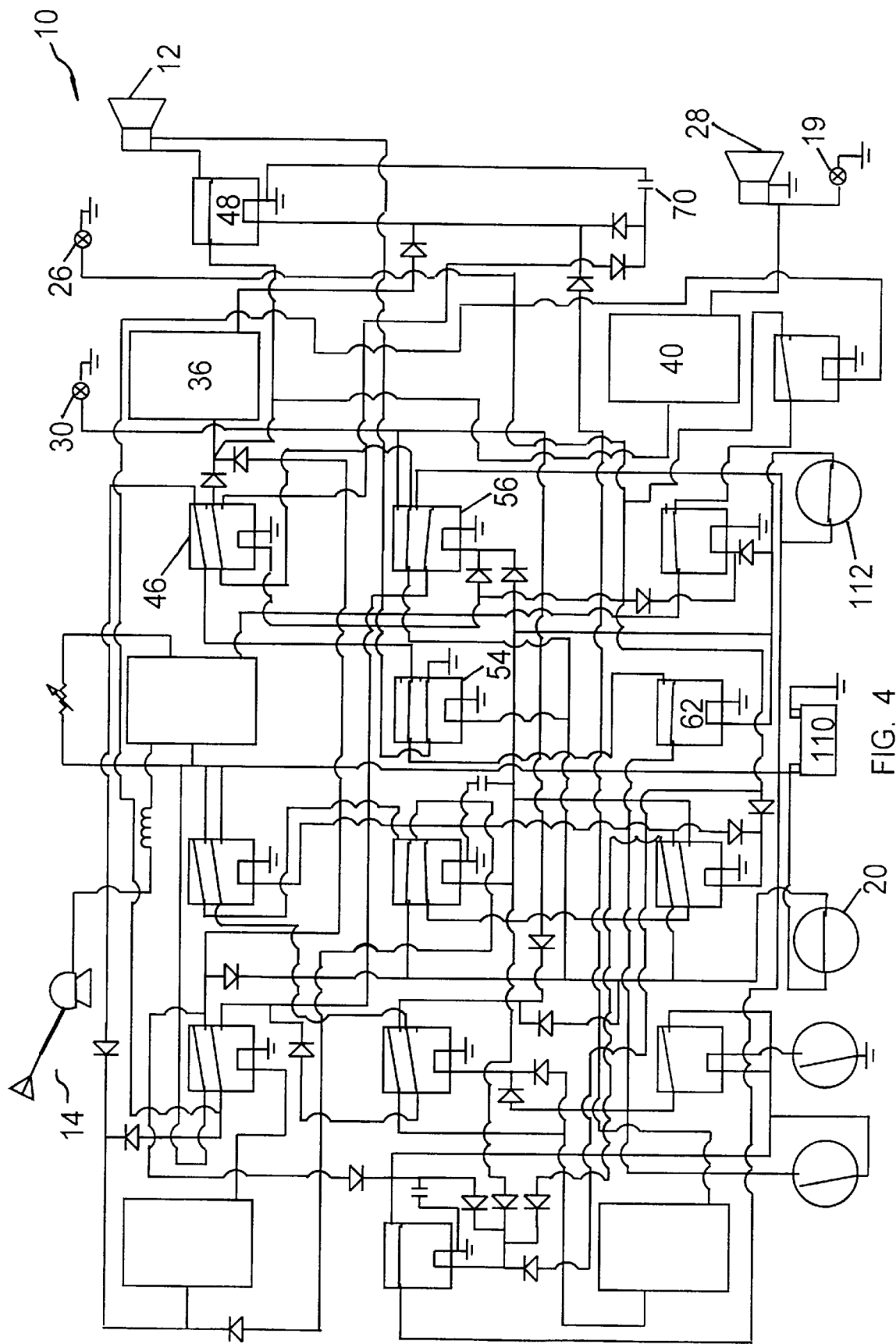

In FIG. 4, the system switch 20 is in the ON position following switching of the ignition switch 112 as described with reference to FIG. 3. Relay 54 is now energised for connecting the warning siren 12 to ground and connecting the output of relay 62 to an input of relay 46. Current from the system switch 20 is made available to active timers 36 and 40 through closed contacts of relays 46 and 56. The high output signal from timer 36 is set for 3 seconds and is applied to energise relay 48 for interrupting current to the siren 12 for 3 seconds. A capacitor 70 is connected to the relay 48 for maintaining energisation of relay 28 for a fraction of a second so that the siren 12 does not produce a momentary signal when timer 36 is activated. Timer 40 provides its pulsating output to switch the buzzer 28 and bezel 19 intermittently for indicating that the siren 12 will be switched on within 3 seconds. The ON and OFF periods are of the buzzer 28 and bezel 19 are set at respectively 0.5 sec. An adjustable resistor (not shown) is connected in series with buzzer 28 for adjusting its volume.

Figure 5:
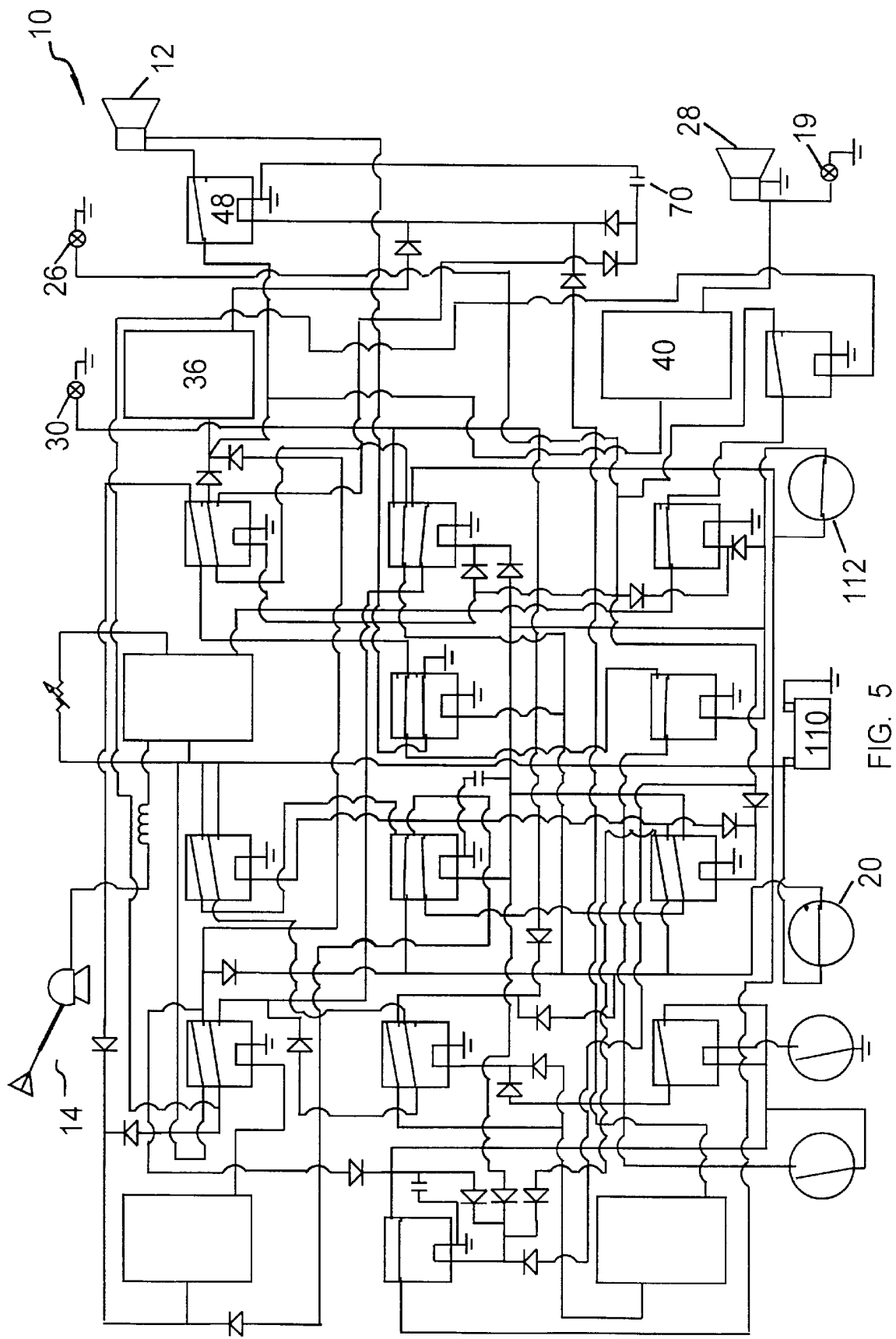
FIG. 5 illustrates the circuit of FIG. 4 and showing the relay contact positions when the predetermined time interval for touching the sensor means has elapsed.

When the 3 second time interval has elapsed, the timer 36 changes its output signal to low and the relay 48 is therefore deenergised to complete the current path from the system switch 20 to the siren 12, as shown in FIG. 5. The siren 12 then generates a warning signal of 120 dB. The bezel 19 and the buzzer 28 continue to generate intermittent indications while the siren 112 is energised.

Figure 6:
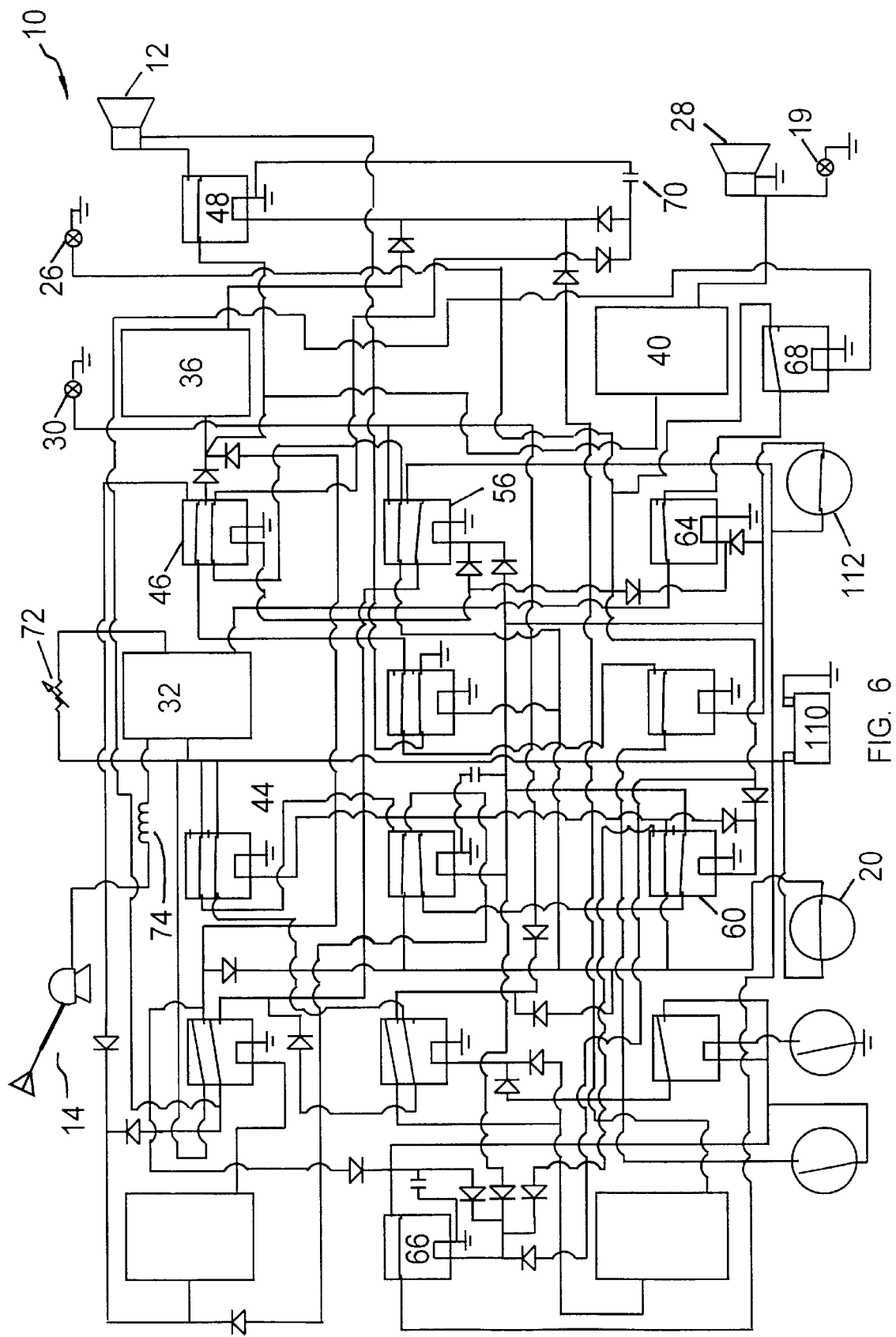
FIG. 6 illustrates the circuit of FIG. 4 and showing the relay contact positions when the touch sensor is touched within the predetermined time interval.

As shown in FIG. 6 when the driver touches the sensor switch 14, whether within or outside the 3 second set far the siren 12, the monostable timer 32 is activated to generate a high output for a time interval which is adjustable between 1 to 90 seconds. A potentiometer 72 coupled to the dial 22 on the facial plate 18 is provided for adjusting the desired time interval. An inductor 74 is connected in series with the touch sensor 14 for eliminating false activating of the timer 32. The high output from the timer 32 is supplied, via relays 64 and 68, to energise relays 66, 46 and 60. The energisation circuit of relay 44 is connected to the system switch 20 via relay 60 and will remain energised until the switch 20 is turned off. On energisation, relay 46 interrupts the current to timers 36 and 40 which in turn switches off the siren 12, and the buzzer 28 and the bezel 19 respectively. The current from the switch 20 is also supplied via relays 46 and 56, to energise relay 48 thereby breaking the current to the siren 12. The contacts of relay 46 will return to its unenergised position after the time interval set for the timer 32 and the circuit therefore returns to the state as described in FIG. 4. The cycle will continue until the system switch is turned off.

Figure 7:
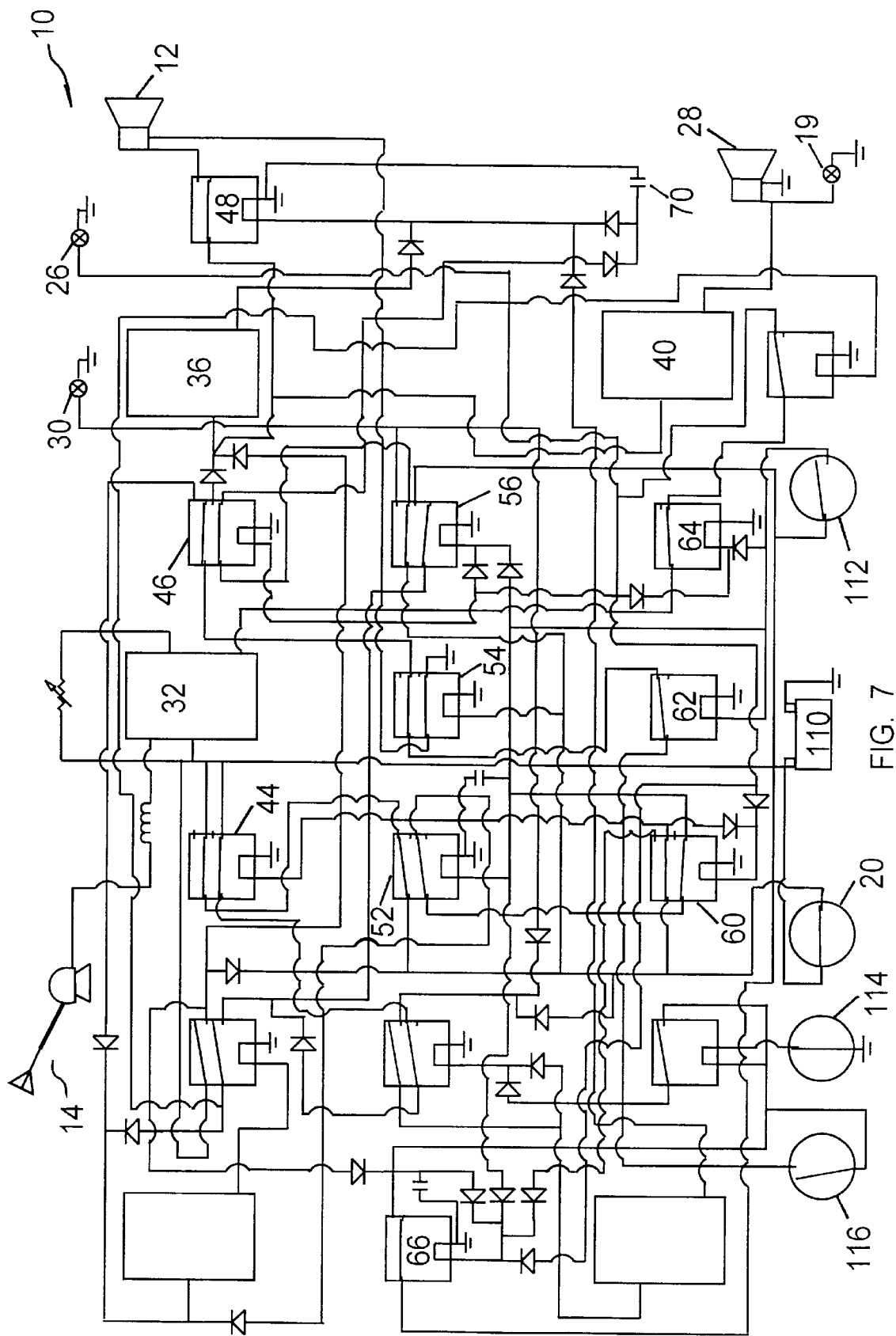

To arm the anti-theft device of the warning system 10, the ignition switch 112 and the system switch 20 must he in the "ON" position. The driver touches the touch sensor 14 in order to activate the timer 32 and, if desired, the time interval for the timer 32 can be adjusted to give sufficient time for the driver and occupants to leave the vehicle before the system 10 is armed. FIG. 7 shows the circuit where the door switch 114 or 116 depending on whether the door switch as a positive or negative earthed type, is closed (i.e. a door is open) and the ignition switch 112 is off. Relays 52 and 62 are now deenergised, while the high output from the timer 32 maintains energisation of relays 46, 56, 64 and 66. The current from the system switch 20 keeps relays 44, 48, 54 and 60 energised.

Figure 8:
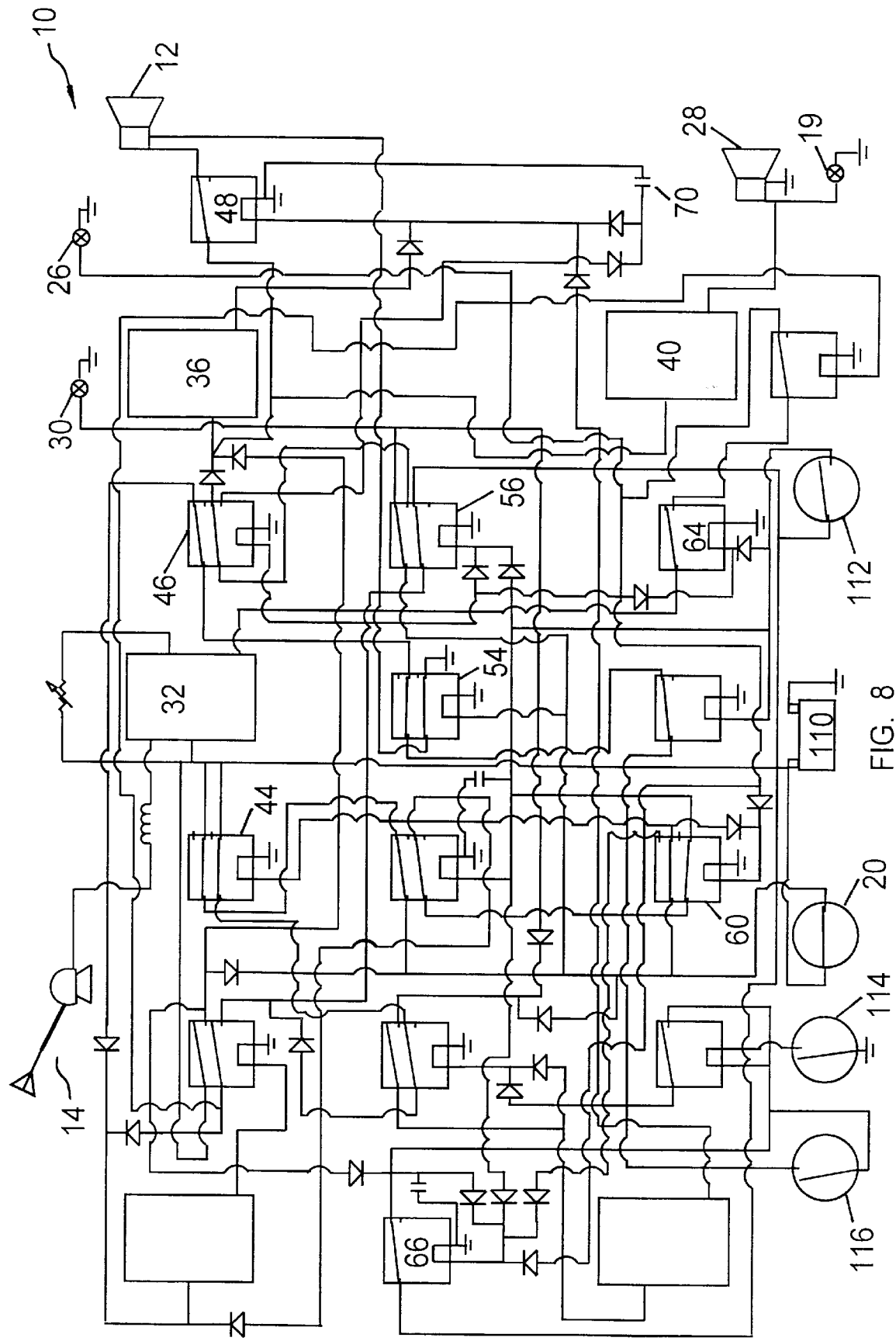
FIG. 8 illustrates the circuit of FIG. 7 and showing the relay contact positions when the door switch is returned to OFF position for placing the system in the armed state.

When the output from the timer 32 goes low after the set time interval and the door switch 114 or 116 is open again (i.e. all doors in a closed position), the system 10 is armed as shown in FIG. 8. Relays 46, 48, 56, 64 and 66 are now deenergised. The current from the system switch 20 is also supplied via relay 56, to flashing LED 30 for indicating that the system is armed. Touching the touch sensor 14 does not affect the system 10 in the armed state as relay 64 breaks the current path of timer 32 to relays 46, 48, 56, 64 & 66.

Figure 9:
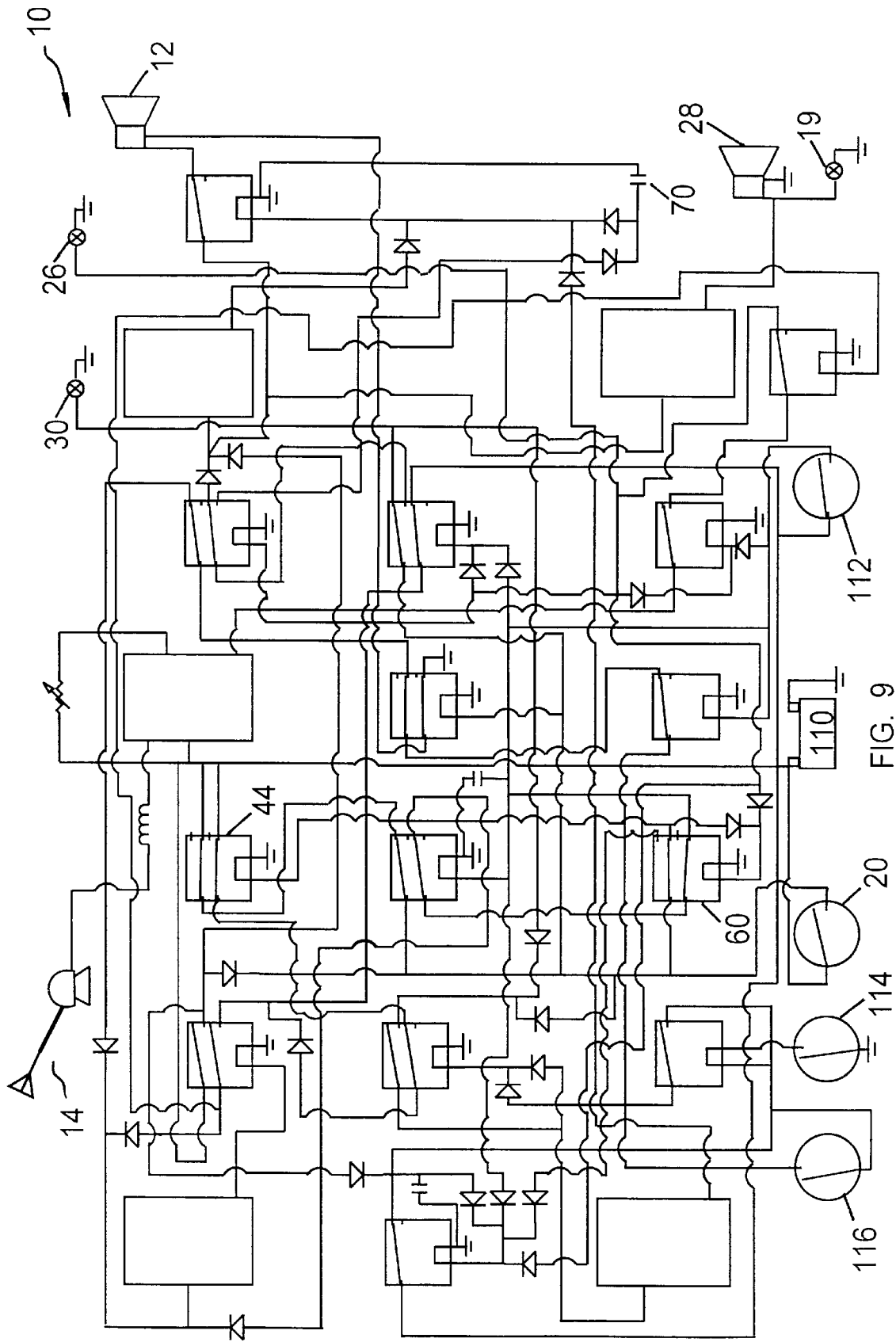
FIG. 9 illustrates the circuit of FIG. 8 and showing the relay contact positions when the system switch is turned OFF while in the armed state.

FIG. 9 shows the positions of the various relays of the system 10 when the system switch 20 is switched of by a person who gains entry into the vehicle without opening one of the vehicle doors, e.g. through an open or broken window. In this situation relays 44 and 60 remains in the energised state and the system 10 is still armed irrespective of whether the system switch 20 is 'on' or 'off'.

Figure 10:
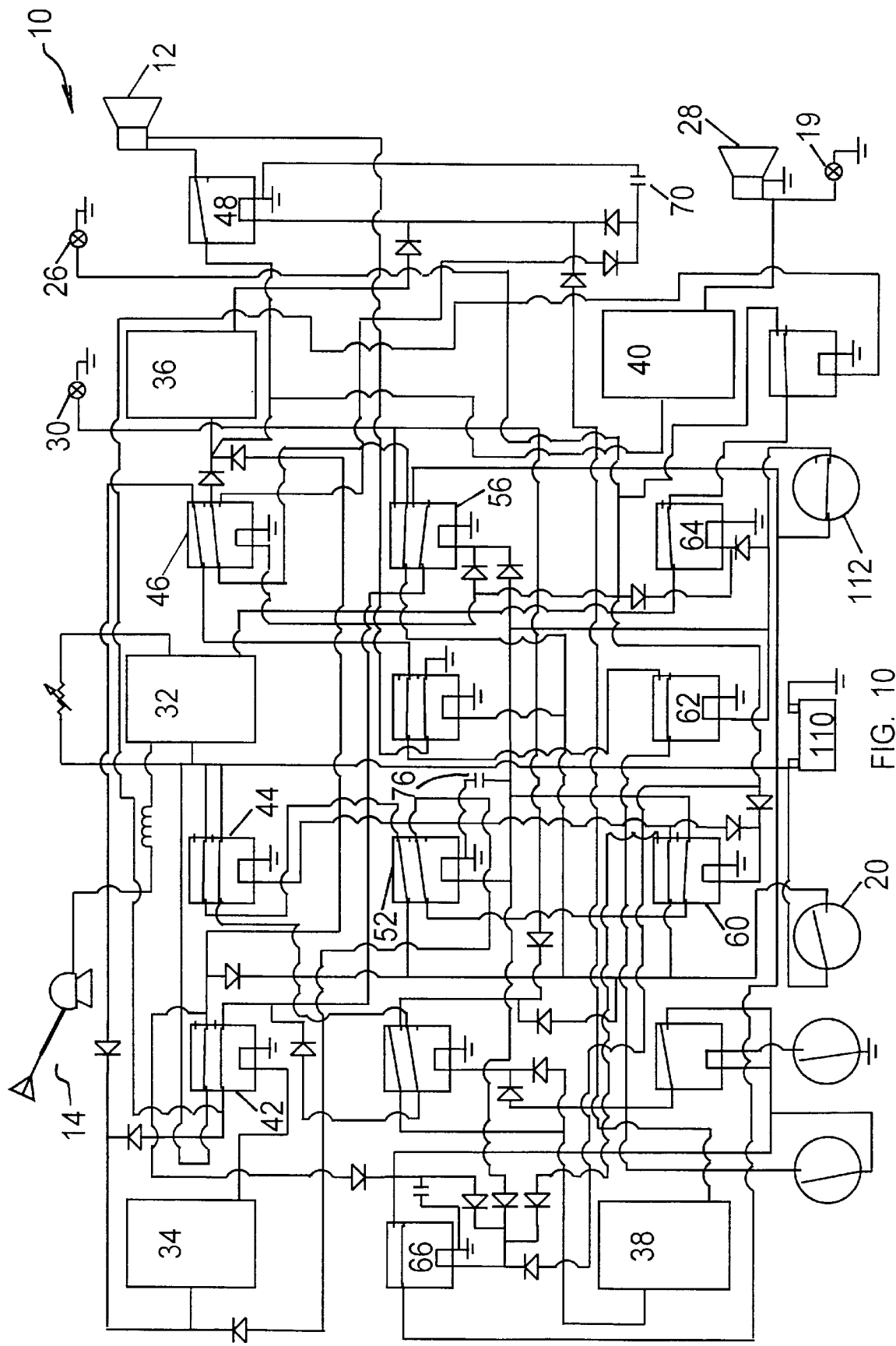
FIG. 10 illustrates the circuit of FIG. 9 and showing the relay contact positions when the ignition switch is "hot wired"

FIG. 10 shows the relay positions when the ignition switch 112 is hot wired ON following switching the system 10 off, as described with reference to FIG. 9. As shown, relays 52, 56, 62, 64 and 66 are now energised. Current from the ignition switch 112 is provided to activate timer 34 through the closed contacts of relays 52 and 60. A capacitor 76 is provided to delay energisation of the relay 52 until the timer 34 generates its high output for energising relay 42. The high output from the timer 34 is set to continue for 3 minutes and energises relay 42 for that time period. The energised relay 42 completes a current path from the battery 110 to the timers 36 and 40. The timer 40 provides pulsed current to buzzer 28 and bezel 19 and the timer 36 energises the relay 48 for interrupting the current path form the battery to the siren 12 for 3 seconds. After the said 3 seconds relay 48 is deenergised and the siren 12 produces a warning signal of 120 dB.

The warning signal from the siren 12 will continue for the 3 minute period set by the timer 34. Touching the sensor 14 will not affect the system 10 as the relay 68 is now energised to interrupt current from the timer 32. Relay 66 remains energised by current from relay 42. Energised relay 66 prevents the relay 48 from energisation by opening a door, and thereby preventing the warning from the siren 12 from being interrupted by opening a door.

To re-enter the vehicle without activating the alarm within 1 to 3 seconds one of the vehicle doors must first be opened. The ignition switch is then switched ON followed by turning the system switch off within 15 seconds of opening the door.

Figure 11:
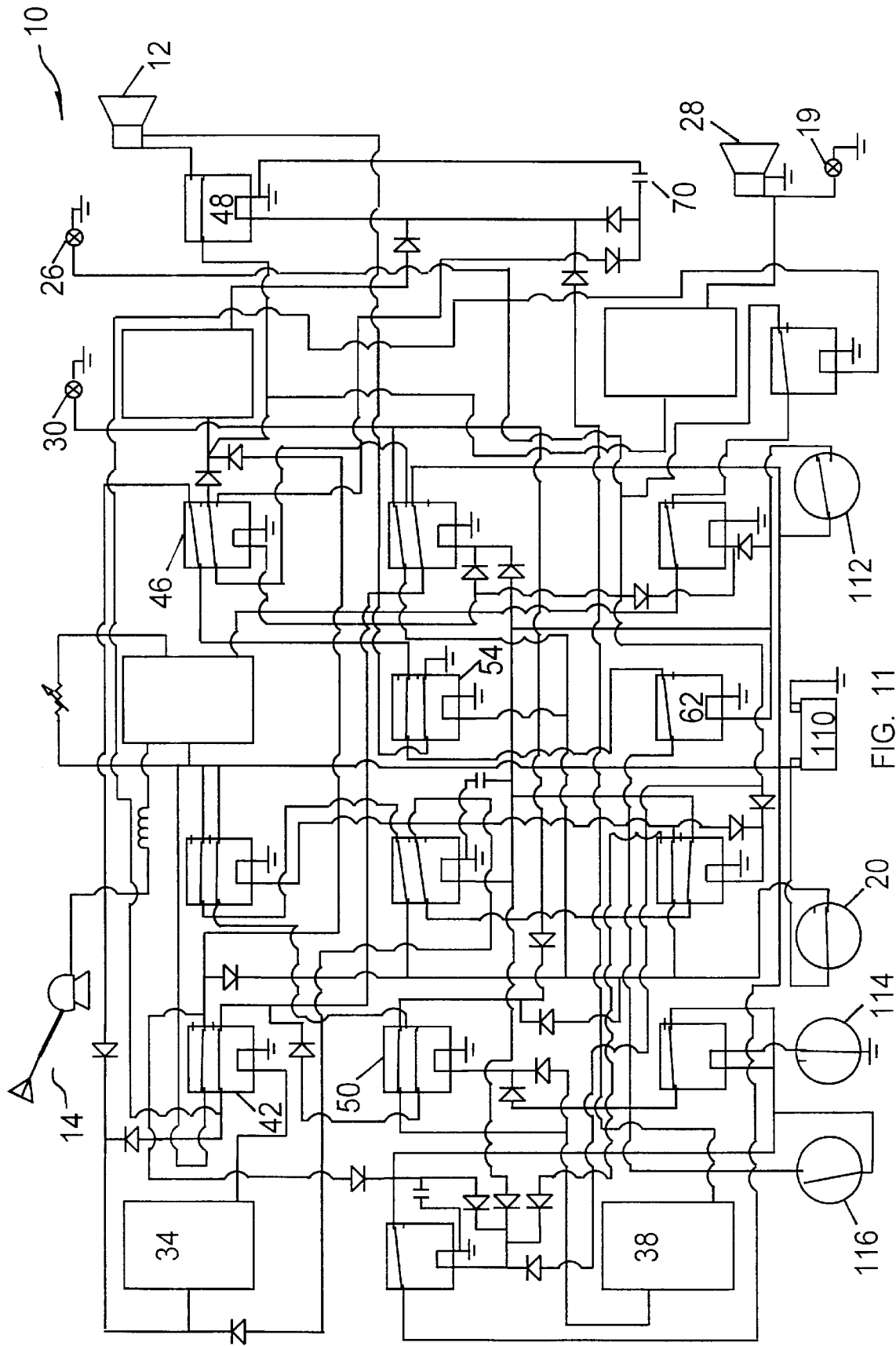
FIG. 11 illustrates the circuit of FIG. 8 and showing the relay contact positions during re-entry through one of the doors.

FIG. 11 shows the circuit of the system 10 when the door switch 114 is closed while the anti-theft device is armed. As shown, the astable timer 38 receives an activation current at its input. The activation current is supplied from the system switch 20 via the energised relay 50. The astable timer 34 is also activated by a current via closed contacts of relay 46, 54 and 62. The output from the timer 34 energises the relay 42 which now provides a current path to the siren 12. The output from timer 38 energises the relay 4 for 15 seconds so that the current for activating the siren 12 is interrupted for 15 seconds. To prevent the warning from the siren 12 after the elapse of 15 seconds the ignition switch 112 must be in the ON position within the 15 second period to cut off activation current to the timer 34.

Figure 12:
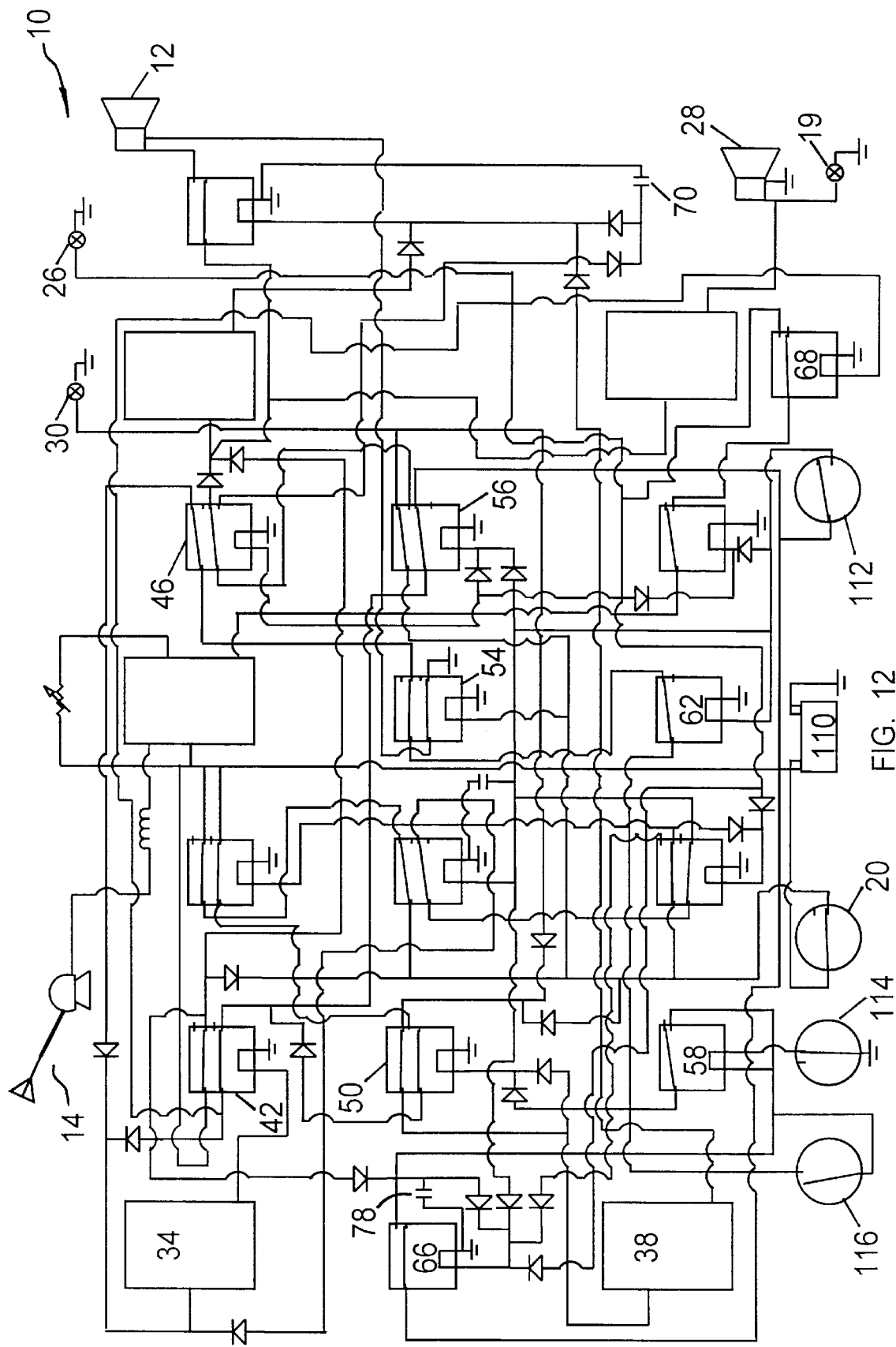
FIG. 12 illustrates the circuit of FIG. 11 and showing the relay contact positions after a delay by a capacitor.

FIG. 12 shows the contact positions of the relays 66 and 68 after the relay 42 receives an energisation, current from the timer 34. A capacitor 78 is connected to the energisation circuit of the relay 66 for the purpose of delaying its energisation until after the relay 50 is energised. The timer 36 is activated by the current through the energised relay 50. Similarly, the delayed energisation of the relay 66 ensures that the relay 42 is energised before the current path to the timer 34 through the relays 46, 54, 62 and 58 is broken. The timer 34 remains activated by a current though closed contacts of the relays 56 and 42. The relay 66 is energised to break the current path provided by touching the sensor 14. This prevents turning off the alarm by an inevident touching of the sensor 14 prior to turning the ignition switch 112 ON.

Figure 13:
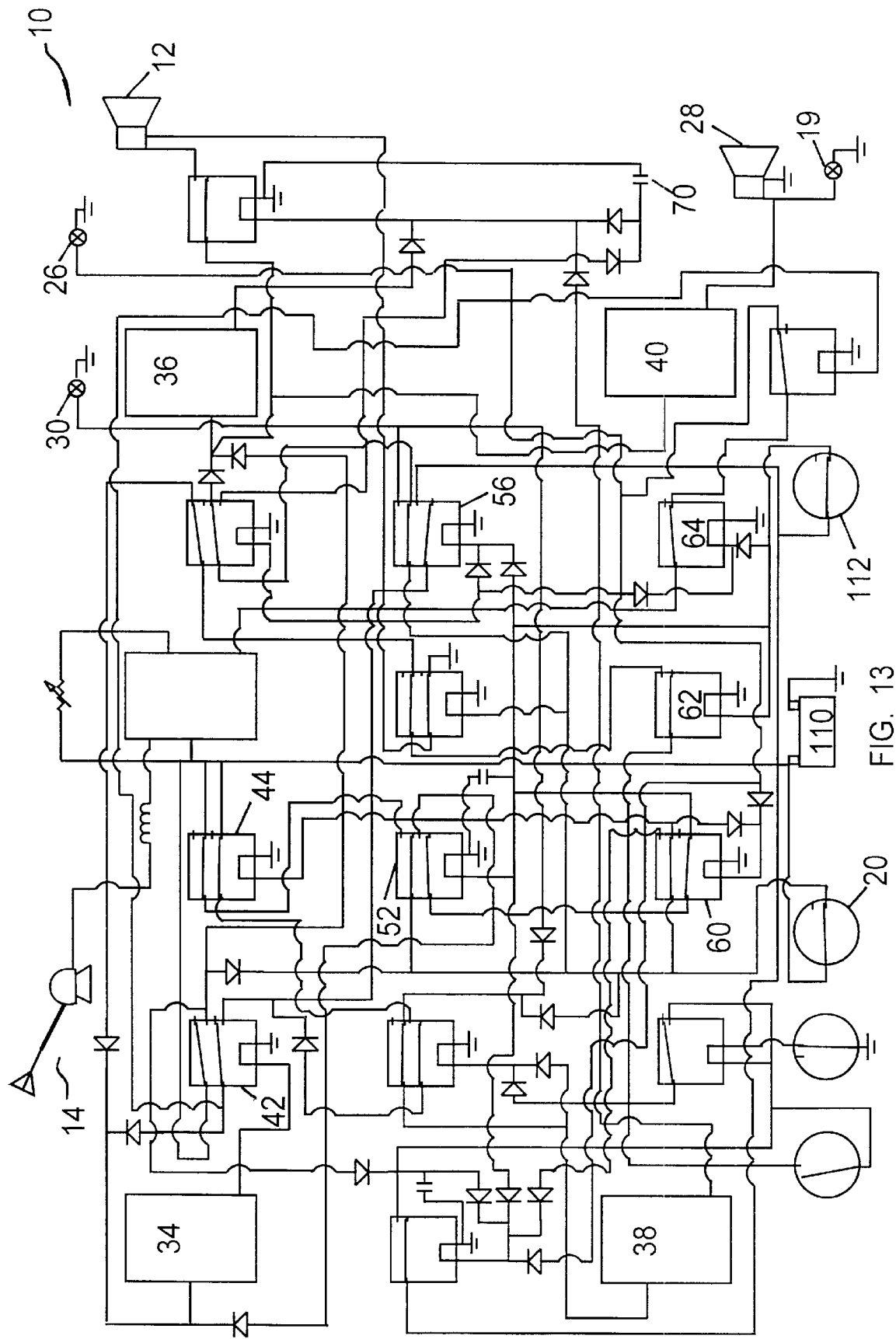
Figure 14:
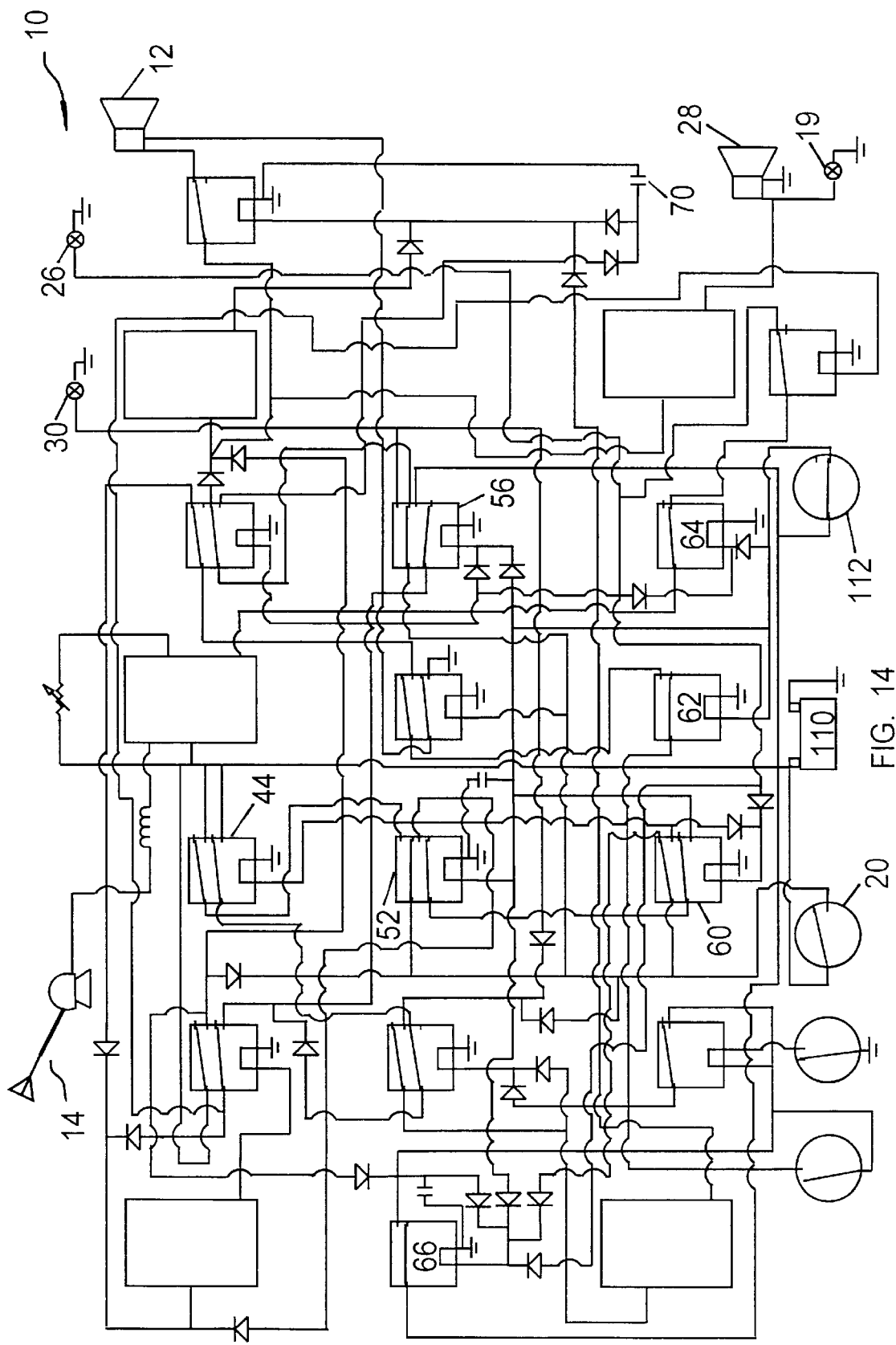
FIG. 14 illustrates the circuit of FIG. 13 and showing the relay contact positions when the system switch is turned OFF.

When the ignition switch 112 is switched ON following a normal re-entry as shown in FIG. 13, the relays 52, 56, 62 and 64 are energised by a current through the ignition switch 112. Energised relay 56 cuts off current to the timer 34 and the relay 42 is thereby deenergised. Activation current to the timers 36 and 40, and the current to the siren 112 are accordingly interrupted. If the system switch 20 is turned OFF before the ignition switch 112, the circuit will return to the state as described with reference to FIG. 3.

To completely disarm the system 10 the system switch 20 must be turned OFF following the steps described in the previous paragraph, and the switching must be within the 15 second time period set for the timer 38. Relays 44 and 60 will be deenergised following switching the switch 20 OFF within the time period, as shown in FIG. 3. If the system switch 20 is still ON after the time period set of timer 34 the system 10 reverts to driver alert state described earlier as shown in FIG. 4. Switching the ignition switch 112 off will return the system 10 to the state as shown in FIG. 2.

Figure 15:
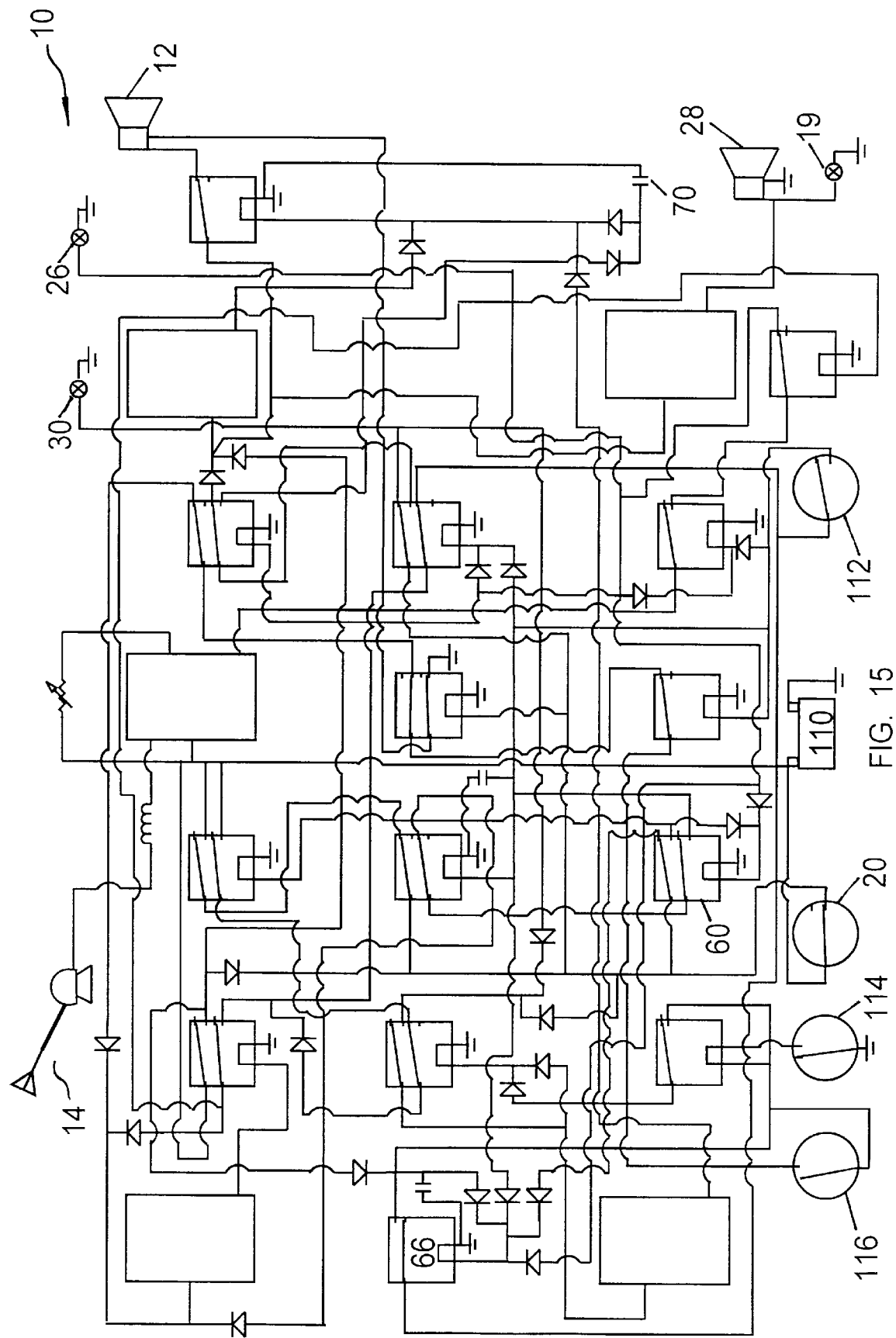

The system 10 is adapted to prevent this siren 12 from being energised by placing the system switch 20 ON while the ignition switch 112 is OFF. This is useful in preventing unnecessary warning when the system 10 is switched on by a child or inevident switching while in the vehicle. As shown in FIG. 15 the system switch 20 is ON while the ignition switch is OFF. Relay 66 is energised by a current from the switch 20 via closed contacts of relay 60 and the current to the door switch 114 or 116 is cut off. Therefore opening or closing the doors will not set the alarm.

Figure 16:
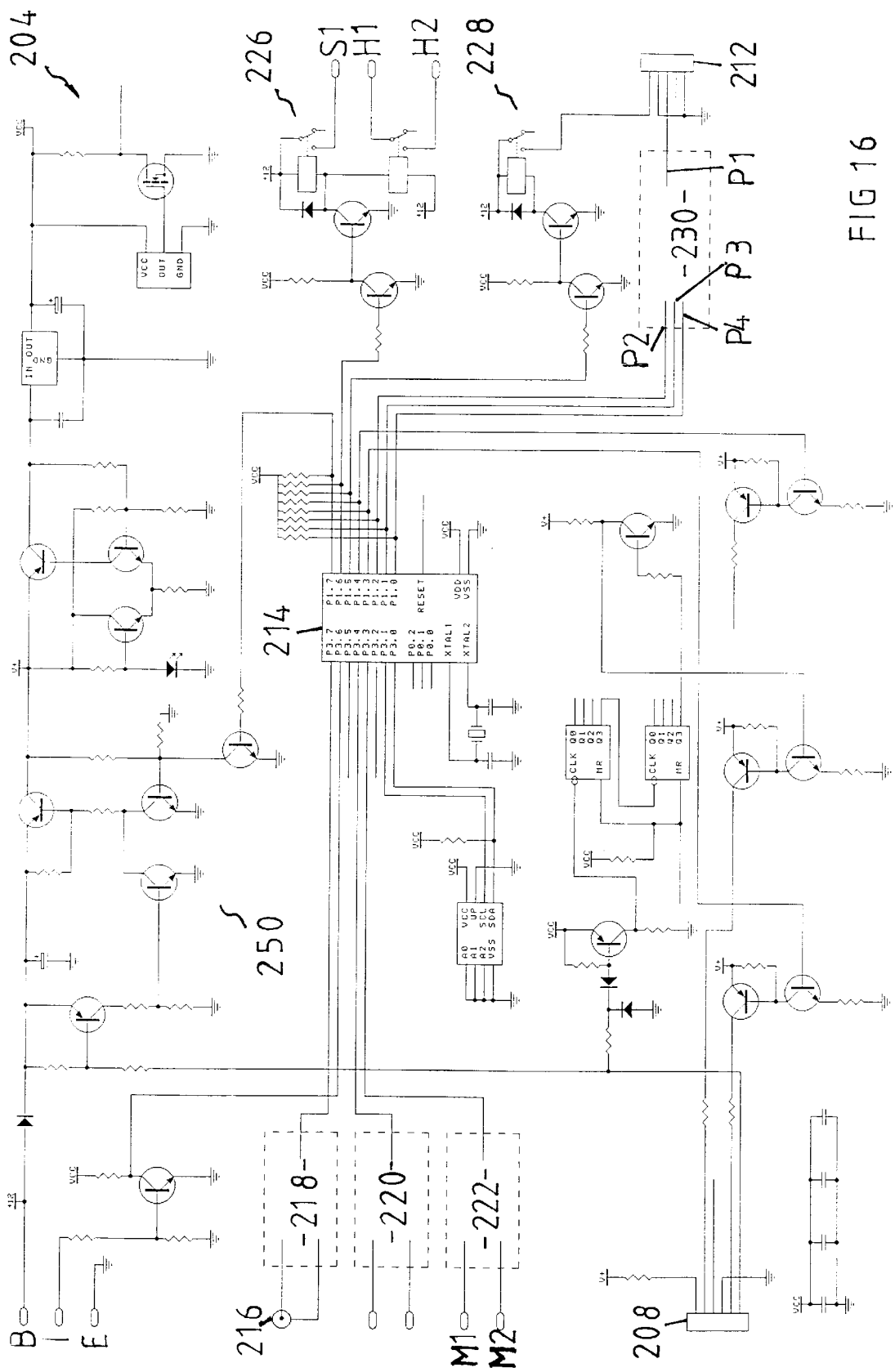
FIG. 16 illustrates a circuit within a fixed unit of a second example according to the present invention.
Figure 17:
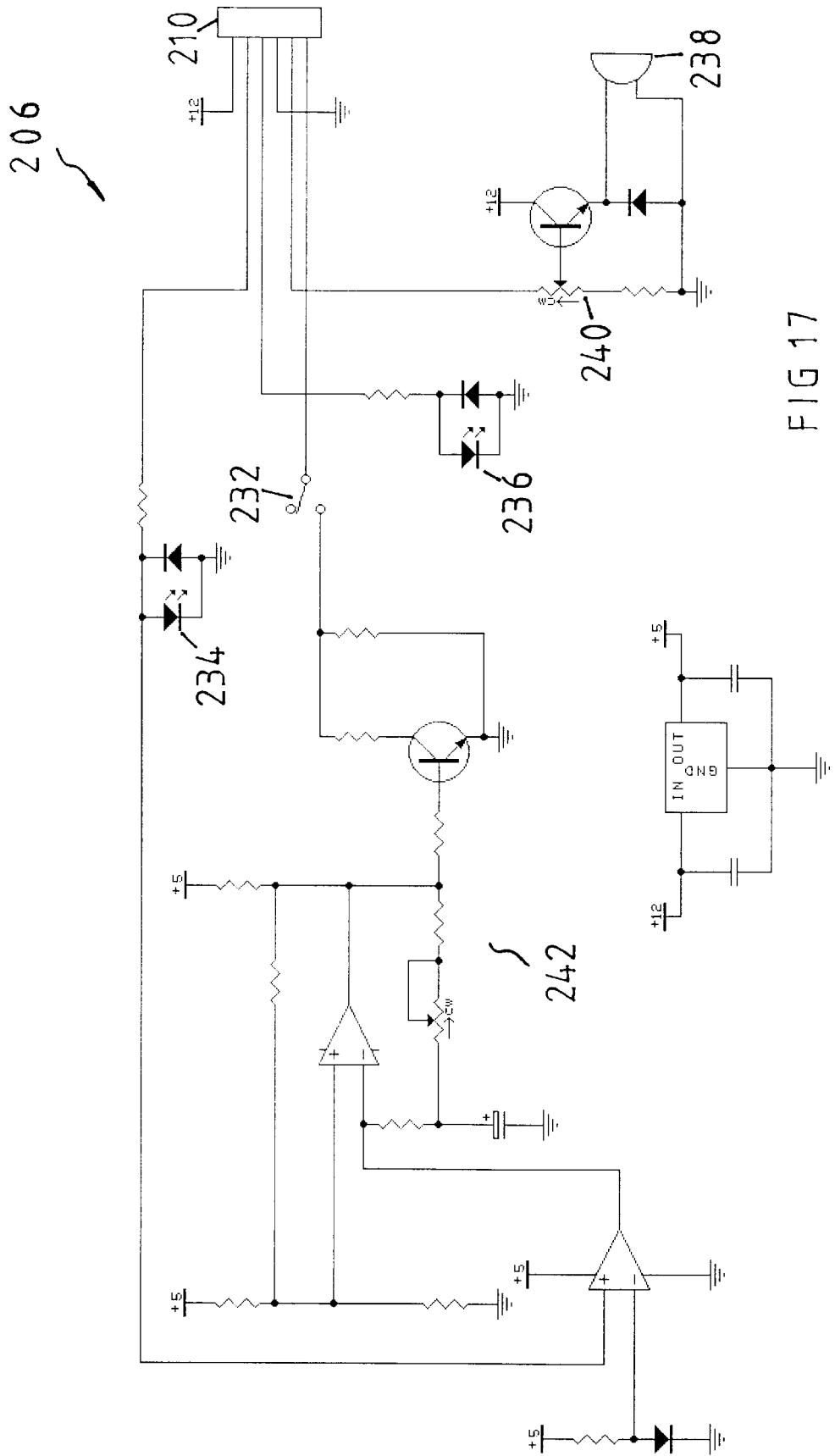
FIG. 17 illustrates a circuit within a removable unit of the second example according to the present invention.

Referring now to the example of the system 10 shown in FIGS. 16 and 17, the system 10 has a controller unit 200 (not shown) for fixedly secured within the vehicle 100, and a removable portable unit 202 (not shown) for removably secured to the vehicle 100 and for connection to the controller unit 200.

The controller unit 200 houses electronic components connected in a circuit 204 as shown in FIG. 16. The portable unit 202 houses electronic components connected in a circuit 206 as shown in FIG. 17. Units 204 and 206 are removably connected by means of a 6-pin male connector 206 on the unit 204 and a compatible female connector 210 connected by a suitable cable to the portable unit 206.

The unit 204 also has another male connected 212 which in this case is a 5-pin DIN for connection to a compatible connector of a headphone (not shown).

The controller circuit 204 has a programmable controller 214 which in this case is a 87C50 controller. The controller 214 is adapted to sense the touch sensor means 14 which is connected to the controller 214 via a RCA connector 216 and a touch switching circuit 218.

The controller 214 is also connected to one or more door sensors (not shown) and a motion sensor (not shown) respectively by way of a door sensing circuit 220 and a motion detection circuit 222 which as shown is a ultrasonic circuit.

FIG. 18 shows in detail the components of the touch switching circuit 218. The Figure shows that the touch sensor 14 is connected to terminals T1 and T2. A 555 timer 224 generates a high output at for indicating touching of sensor 14 to the controller 214.

FIGS. 19 and 20 shows in detail the respective door sensing circuit 220 and the motion detection circuit 222.

Referring to FIG. 19 the motion sensor (not shown) is connected to terminals M1 and M2. The ultrasonic circuit 222 switches its state at C of unit 226 when motion within the vehicle is detected. The controller 214 on sensing the change of state will activate the warning means (siren) and the warning lights (hazard lights). The headphone when connected to the connector 212 will also receive the warning signal.

Warning means in the form of a siren is connected terminal S1. Visual indicator means in the form of hazard lights are connected to terminals H1 and H2. Relay switching units 226 and 228 are employed for switch the warning means and the headphone respectively.

A headphone circuit 230 connects the headphone to the controller 214. FIG. 21 shows the headphone circuit in detail. Circuit 230 has an IC (74HC4051) for controlling the audio signal to the headphone through terminal P1. Terminals P2, P3 and P4 are connected to the controller 214.

Referring now to the portable unit 206 shown in FIG. 17, a power on/off switch 232 is arranged to turn the system 10 on or off both in the sleep alarm mode or in the anti-theft mode.

Figure 22:
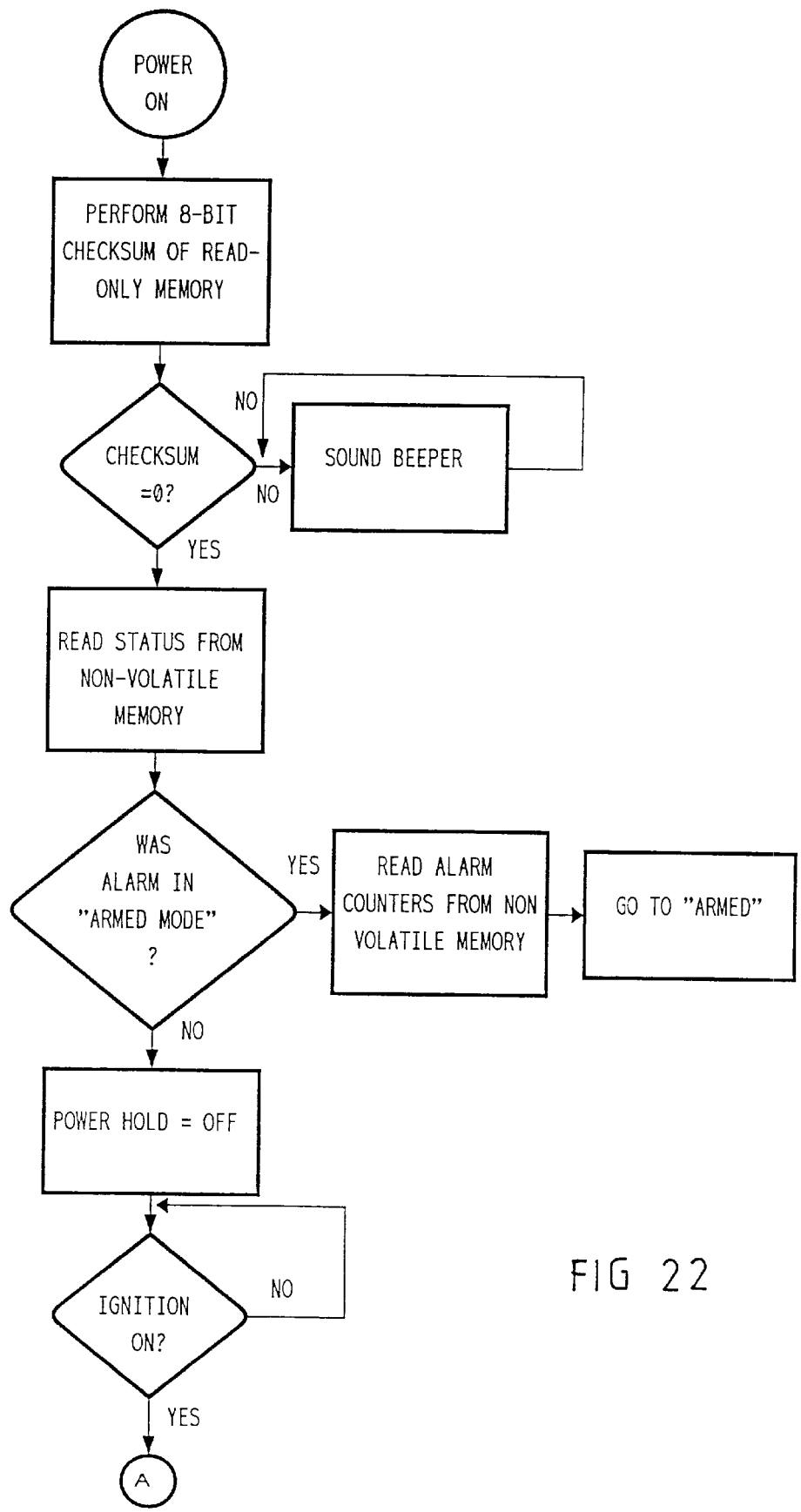
FIG. 22 is a flow chart showing certain operation steps of the system shown in FIGS. 16 to 21.

When the switch 232 is first turned on the system 1 performs a self checking sub-routine as shown in the flow chart on FIG. 22. The controller 213 also stores the state of the system 10 in a non-volatile memory when in the armed mode. When power to system 10 is returned after an interruption for any reason, the system 10 uses the information stores in the memory for resuming at the state of the armed mode from when the interruption occurs.

The controller 214 is programmed to distribute storage locations at the memory so that the storage location usage is evenly distributed. This increases the useable life of the memory.

Referring back to circuit 206 a green LED 234 and a red LED 236. LED 234 is in the ON condition when the switch 232 is put in the ON position. LED 236 lights up when the ignition is switched ON. A Piezo beeper 238 is controller through a variable resistance 240. A timer control circuit 242 controls the time interval for activating the warning means in the sleep mode. It also controls the time required for closing the car doors in the armed mode. The time interval can be set between 0 second and 15 second by the driver.

As shown in FIG. 16 system 10 has switchable power supply circuit 250 for connecting the vehicle battery supply (not shown) through terminal B to the controller 214. The vehicle ignition is also connected to the controller 214 through terminal I. Terminal E is connected to earth.

Figure 23:
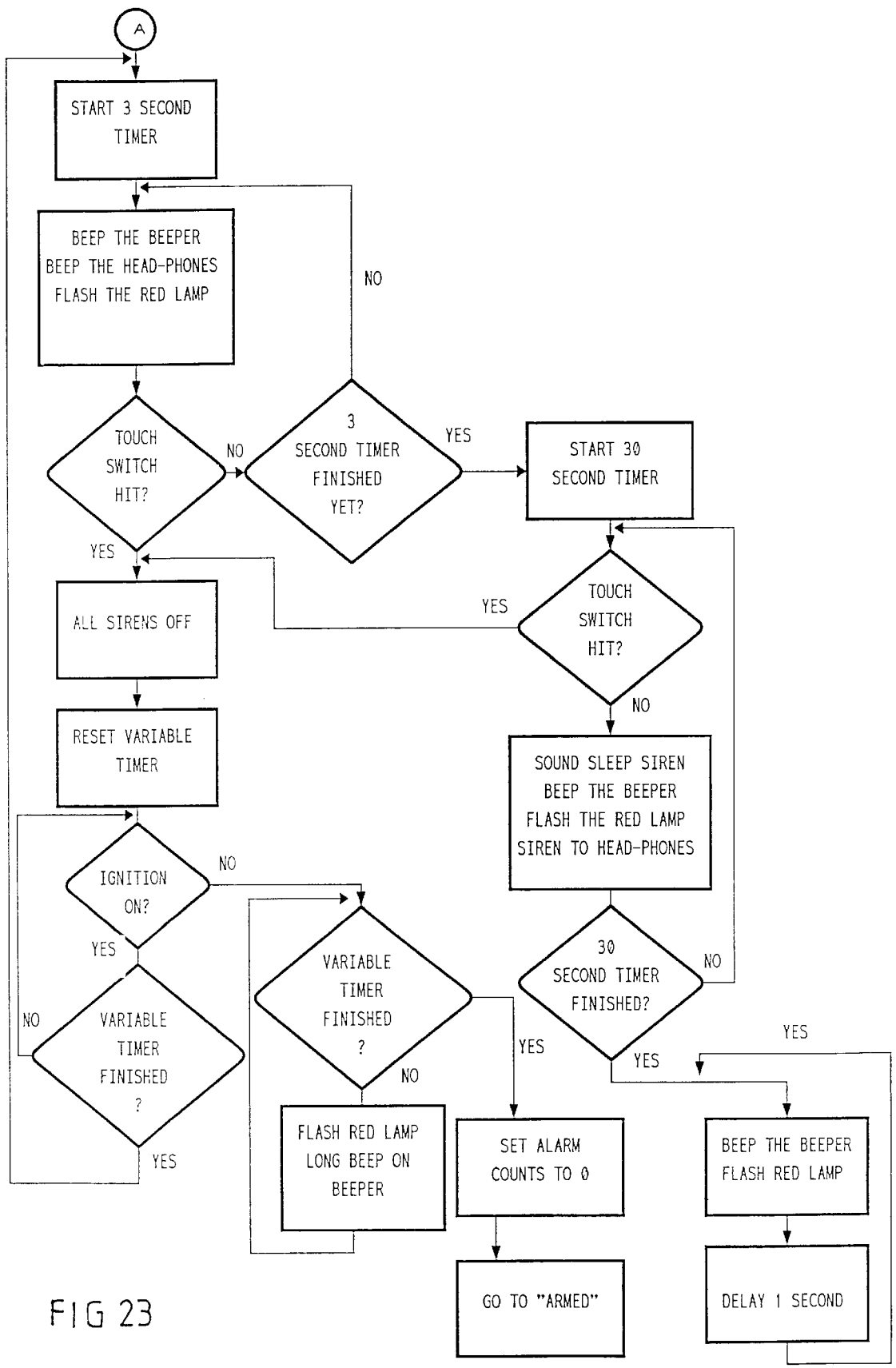
FIG. 23 is a flow chart showing the operation steps following the steps in FIG. 22.
Figure 24:
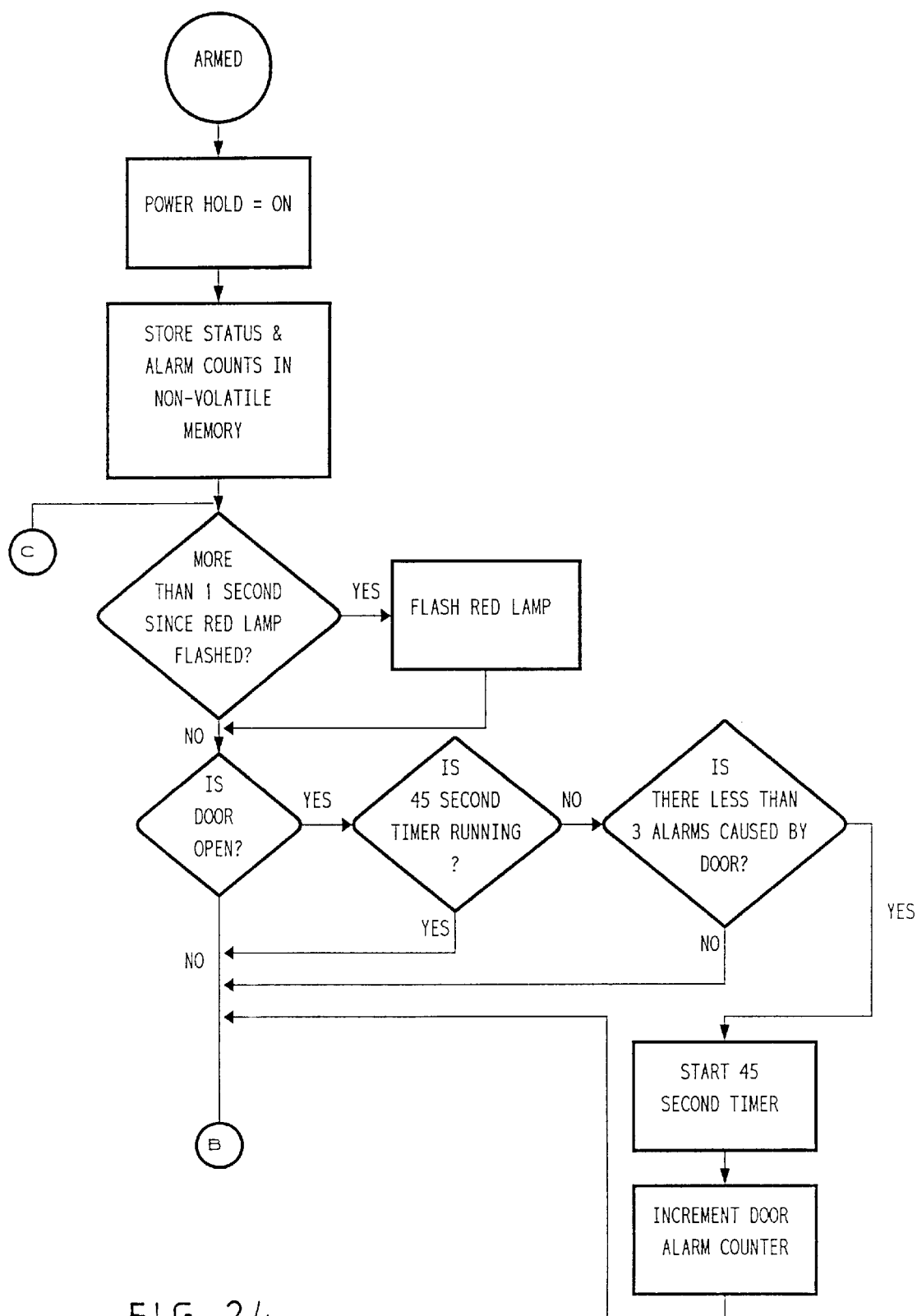
FIG. 24 is a flow chart showing the operation steps following the steps in FIG. 23.
Figure 25:
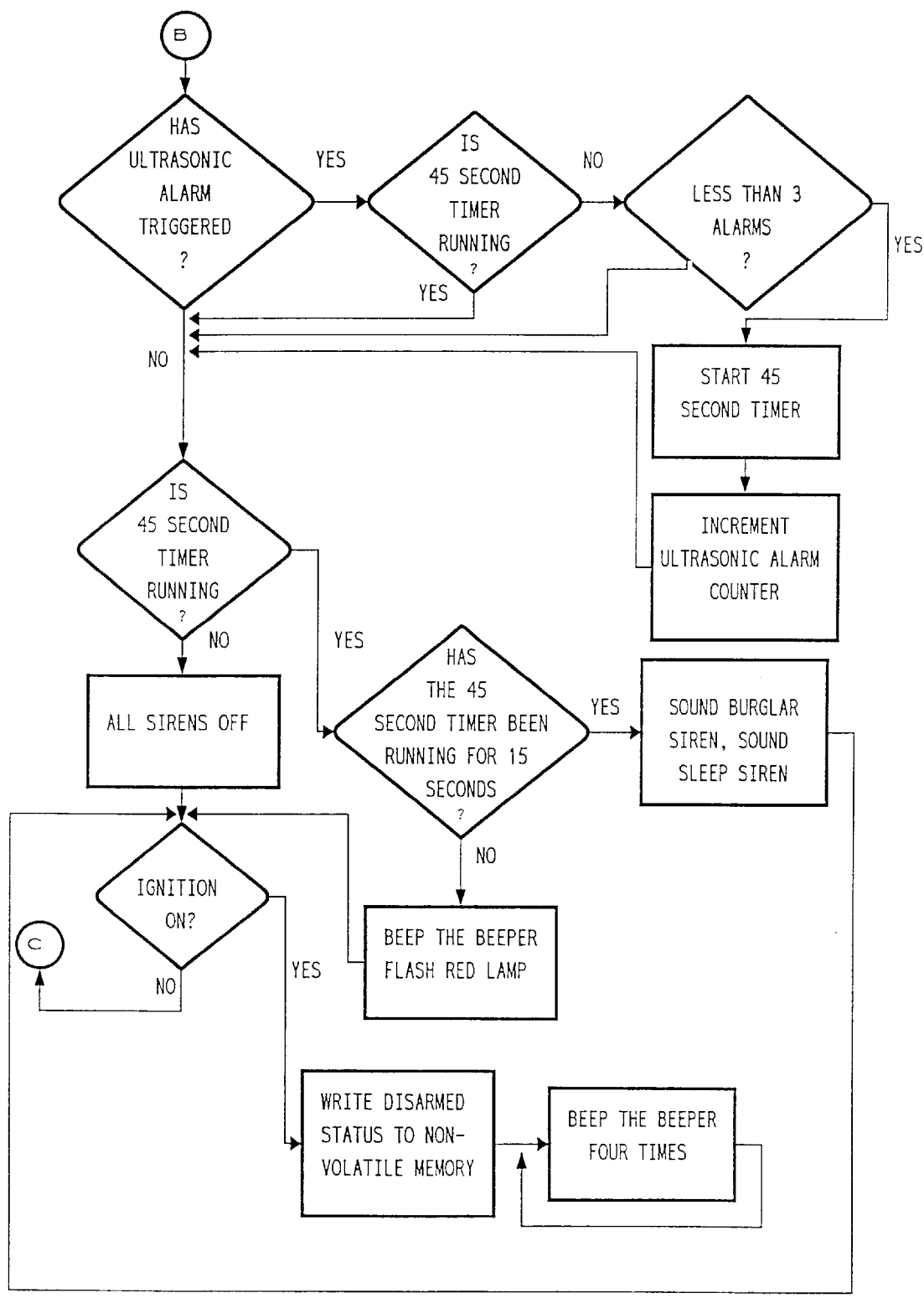
FIG. 25 is a flow chart showing the operation steps following the steps in FIG. 24.

The flow chart in FIGS. 22 to 24 describes the operational states of systems 10.

The software codes employed for programming the controller 214 is included as appendix 1 to 5.

Whilst the above has been given by way of illustrative example of the present invention, many variations and modifications thereto will be apparent to those skilled in the art without departing from the broad ambit and scope of the invention as herein set forth in the following claims.

I claim:

1. A warning system for a vehicle, the system comprising:
    touch sensor means having a base which is selectively securable on the vehicle;
    warning means;
    a circuit means connecting the sensor means to the warning means, the circuit means being adapted to detect touching of the sensor means and to activate the warning means after expiration of a first time interval following said touching; and
    an anti-theft device adapted to be armed by touching the sensor, followed by turning the vehicle ignition switch off or by turning the vehicle ignition switch off and opening and then closing any door of the vehicle within the first time interval,
    wherein the circuit means is adapted to energize the warning means when the vehicle ignition switch is "hot wire" or entry into the vehicle is made without opening any door of the vehicle and "hot wiring" during arming of the anti-theft device.

2. The warning system for a vehicle of claim 1, the system further comprising housing means, the circuit means being located in the housing means, the touch sensor means further comprising a touch sensing part adjustably extending from the base which is selectively and removably securable on the vehicle for selecting a position at which the touch sensing part can be touched by a driver of the vehicle, wherein when said touching is detected the circuit means activates the warning means after expiration of the first time interval.

3. The warning system according to claim 1, wherein the touch sensor means further comprises a touch sensing part comprising a capacitive switch or a micro switch which is arranged for switching following touching of the sensing part by any desired body part of a driver, and the sensing part is telescopically adjustable for touching at different locations in the vehicle.

4. The warning system according to claim 1 wherein the circuit means further comprises a first adjustable timing means adapted to delay energization of the warning means for the first time interval which is adjustable between 1 to 15 seconds.

5. The warning system according to claim 4 wherein the circuit means further comprises one of an audio and a visual pre-warning indication means and a second adjustable timing means for delaying activation of the pre-warning indication means for a second time interval following touching of the touch sensor means.

6. The warning system according to claim 5 wherein the circuit means further comprises a third adjustable timing means for setting a third time interval between 1 to 90 seconds, and one of the first timing means and the second timing means are reactivated following elapse of the third time interval.

7. The warning system according to claim 1 wherein the circuit means further comprises one of a noise filter and a shielding for preventing noise signals from falsely activating the warning means.

8. The warning system according to claim 5 wherein the circuit means further comprises a first switching means for controlling energization of the warning means and a second switching means for controlling energization of the first and second timing means, and the first timing means controlling switching of the first switch means.

9. The warning system according to claim 1 wherein the circuit means further comprises an arrangement for preventing de-energization of the warning means by one of touching the touch sensor means and by switching the system off when the anti-theft device is armed.

10. The warning system according to claim 1 wherein the circuit means is arranged so that in order to disarm the anti-theft device and to enter the vehicle without activating the warning means a vehicle door must be open or have been opened and the ignition switch turned to the ON position within a set time period following opening of the door.

11. The warning system according to claim 1 wherein the system further comprises a self testing routine for selectively testing functions of the system, and one of an audio and a visual indication is provided when any of the selected functions fail to function as designed.

12. The warning system according to claim 1 wherein the circuit means further comprises a programmed controller means arranged to detect touching on the touch sensor means and to activate the warning means when touching is not detected within the first time interval.

13. The warning system according to claim 12 wherein the controller means is selectable for a sleep alert operation or an anti-theft operation, and when in the anti-theft operation the controller is arranged to receive signals from theft sensor means which include one of a vehicle door sensor means for detecting opening of any door of the vehicle and a motion detection means for detecting motion of objects in the vehicle.

14. The warning system according to claim 12 wherein the system further comprises housing means for housing the circuit means which further comprises a first removable unit having means for adjusting the first time interval and a system ON/OFF switch, and a second unit having the programmed controller means, the second unit being removable or fixedly secured in the vehicle.

15. The warning system according to claim 14 wherein the first removable unit further comprises adjustment means for one of loudness and brightness of the warning means, and loudness and brightness indicators respectively.

16. A warning system for a vehicle, the system comprising:
    touch sensor means having a base which is selectively securable on the vehicle;
    warning means;
    a circuit means connecting the sensor means to the warning means, the circuit means being adapted to detect touching of the sensor means and to activate the warning means after expiration of a first time interval following said touching; and an anti-theft device adapted to be armed by touching the sensor, followed by turning the vehicle ignition switch off or by turning the vehicle ignition switch off and opening and then closing any door of the vehicle within the first time interval, wherein the circuit means is arranged so that in order to disarm the anti-theft device and to enter the vehicle without activating the warning means a vehicle door must be open or have been opened and the ignition switch turned to the ON position within a set period following opening of the door.

17. The warning system for a vehicle of claim 16, the system further comprising housing means, the circuit means being located in the housing means, the touch sensor means further comprising a touch sensing part adjustably extending from the base which is selectively and removably securable on the vehicle for selecting a position at which the touch sensing part can be touched by a driver of the vehicle, wherein when said touching is detected the circuit means activates the warning means after expiration of the first time interval.

18. The warning system according to claim 16, wherein the touch sensor means further comprises a touch sensing part comprising a capacitive switch or a micro switch which is arranged for switching following touching of the sensing part by any desired body part of a driver, and the sensing part is telescopically adjustable for touching at different locations in the vehicle.

19. The warning system according to claim 16 wherein the circuit means further comprises a first adjustable timing means adapted to delay energization of the warning means for the first time interval which is adjustable between 1 to 15 seconds.

20. The warning system according to claim 19 wherein the circuit means further comprises one of an audio and a visual pre-warning indication means and a second adjustable timing means for delaying activation of the pre-warning indication means for a second time interval following touching of the touch sensor means.

21. The warning system according to claim 20 wherein the circuit means further comprises a third adjustable timing means for setting a third time interval between 1 to 90 seconds, and one of the first timing means and the second timing means are reactivated following elapse of the third time interval.

22. The warning system according to claim 16 wherein the circuit means further comprises one of a noise filter and a shielding for preventing noise signals from falsely activating the warning means.

23. The warning system according to claim 20 wherein the circuit means further comprises a first switching means for controlling energization of the warning means and a second switching means for controlling energization of the first and second timing means, and the first timing means controlling switching of the first switch means.

24. The warning system according to claim 20 wherein the circuit means further comprises an arrangement for preventing de-energization of the warning means by one of touching the touch sensor means and by switching the system off when the anti-theft device is armed.

25. The warning system according to claim 16 wherein the system further comprises a self testing routine for selectively testing functions of the system, and one of an audio and a visual indication is provided when any of the selected functions fail to function as designed.

26. The warning system according to claim 16 wherein the circuit means further comprises a programmed controller means arranged to detect touching on the touch sensor means and to activate the warning means when touching is not detected within the first time interval.

27. The warning system according to claim 26 wherein the controller means is selectable for a sleep alert operation or an anti-theft operation, and when in the anti-theft operation the controller is arranged to receive signals from theft sensor means which include one of a vehicle door sensor means for detecting opening of any door of the vehicle and a motion detection means for detecting motion of objects in the vehicle.

28. The warning system according to claim 26 wherein the system further comprises housing means for housing the circuit means which further comprises a first removable unit having means for adjusting the first time interval and a system ON/OFF switch, and a second unit having the programmed controller means, the second unit being removable or fixedly secured in the vehicle.

29. The warning system according to claim 28 wherein the first removable unit further comprises adjustment means for one of loudness and brightness of the warning means, and loudness and brightness indicators respectively.

* * * * *